(12) United States Patent
Kasahara et al.

(10) Patent No.: US 8,429,732 B2
(45) Date of Patent: Apr. 23, 2013

(54) DATA COMMUNICATION METHOD AND DATA COMMUNICATION SYSTEM

(75) Inventors: Mika Kasahara, Yokohama (JP); Yoshihito Yoshikawa, Yokohama (JP); Maki Nagano, Tokyo (JP); Nobuyoshi Ando, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 198 days.

(21) Appl. No.: 12/827,280

(22) Filed: Jun. 30, 2010

(65) Prior Publication Data
US 2011/0016517 A1 Jan. 20, 2011

(30) Foreign Application Priority Data

Jul. 16, 2009 (JP) ................................. 2009-168069
Apr. 22, 2010 (JP) ................................. 2010-099110

(51) Int. Cl.
*G06F 7/04* (2006.01)
(52) U.S. Cl.
USPC ................................................ 726/7; 726/20
(58) Field of Classification Search .................... None
See application file for complete search history.

(56) References Cited

U.S. PATENT DOCUMENTS

| | | | | |
|---|---|---|---|---|
| 2002/0095507 | A1* | 7/2002 | Jerdonek | 709/229 |
| 2003/0177388 | A1* | 9/2003 | Botz et al. | 713/201 |
| 2003/0204610 | A1* | 10/2003 | Howard et al. | 709/229 |
| 2005/0044377 | A1* | 2/2005 | Huang | 713/182 |
| 2005/0246295 | A1* | 11/2005 | Cameron | 705/412 |
| 2006/0282535 | A1 | 12/2006 | Matsukawa et al. | |
| 2007/0022469 | A1* | 1/2007 | Cooper et al. | 726/3 |
| 2008/0307500 | A1* | 12/2008 | Garnier De Falletans | 726/3 |
| 2010/0250955 | A1* | 9/2010 | Trevithick et al. | 713/185 |
| 2010/0281530 | A1* | 11/2010 | Tarkoma | 726/9 |
| 2010/0306533 | A1* | 12/2010 | Phatak | 713/156 |
| 2011/0001999 | A1* | 1/2011 | Nanaumi | 358/1.14 |

FOREIGN PATENT DOCUMENTS

| | | |
|---|---|---|
| JP | 7-212353 A | 8/1995 |
| JP | 10-135953 A | 5/1998 |
| JP | 2004-147034 A | 5/2004 |
| JP | 2005-136940 A | 5/2005 |
| JP | 2006-339907 A | 12/2006 |
| JP | 2008-250837 A | 10/2008 |

* cited by examiner

*Primary Examiner* — Jeffrey Pwu
*Assistant Examiner* — Carlos Amorin
(74) *Attorney, Agent, or Firm* — Mattingly & Malur, PC

(57) ABSTRACT

A first server in a system includes confirmation requesting unit 110 that receives an authentication request from a predetermined apparatus 400 coupled through a public line and that sends a user confirmation request to a second server in the case where user authentication is successful. A second server includes a user facility identifying unit 210 that receives the user confirmation request from the first server and identifies location information of the user facility of the user and a confirmation result notifying unit 211 that receives a utilization request from a measuring apparatus linked through a dedicated line and identifies disposition location information of the measuring apparatus and that sends a notification of success of user confirmation including the identification information of the user to the first server 100 if the disposition location information of the measuring apparatus is identical to the user facility location information.

10 Claims, 15 Drawing Sheets

[ELECTRIC POWER CONSUMER DB]

| ELECTRIC POWER CONSUMER ID | ELECTRIC POWER CONSUMER NAME | ELECTRIC POWER CONSUMER ADDRESS | ELECTRIC POWER CONSUMER TELEPHONE NUMBER | CONSUMING LOCATION (METER DISPOSITION LOCATION) | METER ID |
|---|---|---|---|---|---|
| J-001 | YY XX | KANAGAWA-KEN xxxxx | 044-XXX-XXXX | KANAGAWA-KEN xxxxxx | M-001 |
| J-002 | NN XX | TOKYO-TO xxxxxx | 03-XXXX-XXXX | TOKYO-TO xxxxxx | M-002 |
| J-003 | GG XX | OSAKA-FU xxxxxx | 06-XXXX-XXXX | OSAKA-FU xxxxxx | M-003 |
| ... | | | | | |

[METER INFORMATION DB]

| METER ID | METER DEVICE INFORMATION | METER DISPOSITION LOCATION ID | METER DISPOSITION ADDRESS |
|---|---|---|---|
| M-001 | MK-001 | MJ-001 | KANAGAWA-KEN xxxxx |
| M-002 | MK-002 | MJ-002 | TOKYO-TO xxxxx |
| M-003 | MK-003 | MJ-003 | OSAKA-FU xxxxx |
| ... | | | |

[SERVICE USER INFORMATION DB]

126

| USER ID | USER PW | USER NAME | USER ADDRESS | USER TELEPHONE NUMBER | ELECTRIC POWER CONSUMER ID | UTILIZATION SERVICE ID |
|---|---|---|---|---|---|---|
| R-001 | PW-001 | YY XX | KANAGAWA-KEN xxxxx | 044-XXX-XXXX | J-001 | SB-001 |
| R-002 | PW-002 | NN XX | TOKYO-TO xxxxx | 03-XXX-XXXX | J-002 | SB-002 |

| UTILIZATION SERVICE PW | UTILIZATION REGISTRATION DATE | UTILIZATION START DATE | UTILIZATION END DATE | METHOD OF PAYMENT | ACCOUNT NUMBER | ... |
|---|---|---|---|---|---|---|
| SBPW-001 | 2009/7/1 | 2009/7/1 | 2012/3/31 | DIRECT DEBIT | KO-001 | ... |
| SBPW-002 | 2009/7/5 | 2009/7/5 | 2012/3/31 | CREDIT | OO | ... |

FIG. 5

[SERVICE UTILIZATION HISTORY DB] 127

| UTILIZATION DATE | UTILIZATION ID | UTILIZATION SERVICE ID | UTILIZATION START TIME | UTILIZATION END TIME | METER ID |
|---|---|---|---|---|---|
| 2009/7/3 | R-001 | SB-001 | 10:10 | 10:30 | M-001 |
| 2009/7/6 | R-001 | SB-002 | 19:30 | 19:55 | M-002 |
| | | | | | |

| METER DISPOSITION LOCATION (=UTILIZATION LOCATION) | SMART METER NETWORK KEY | INTERNET KEY | ... |
|---|---|---|---|
| MJ-001 | ABA | BAB | |
| MJ-002 | CDC | DCD | |
| | | | |

[IN-HOME DATA STORAGE DB] 128

| DATA ID | IN-HOME DATA | TIME |
|---|---|---|
| DT-001 | xxxx .txt | 2009 /06 /01 /12:01:56 |
| DT-002 | yyyy .txt | 2009 /06 /01 /12:01:58 |
| ..  ..  .. | ..  ..  .. | ..  ..  .. |

FIG. 15

DATA COMMUNICATION METHOD AND DATA COMMUNICATION SYSTEM

CROSS-REFERENCE TO RELATED APPLICATIONS

The present application claims priority upon Japanese Patent Application No. 2009-168069 filed on Jul. 16, 2009, and No. 2010-099110 filed on Apr. 22, 2010, which are herein incorporated by reference.

BACKGROUND OF THE INVENTION

Recently, various commercial products such as electronic contents and various services are bought, sold, and provided through networks and various techniques are proposed for user authentication and security of communication. For example, a proposal has been made for a communication apparatus such as a facsimile apparatus capable of improving the security of a received document by effectively using a plurality of lines belonging to the apparatus (Japanese Patent Application Laid-Open Publication No. 2005-136940). A proposal has been made for a server device that allows the visual communication to be made at any place while achieving a sufficient security function for using telephones (Japanese Patent Application Laid-Open Publication No. 2006-339907). A proposal has been made for a data communication system capable of preventing an unauthorized access and easily recognizing an unauthorized access even when the unauthorized access is performed (Japanese Patent Application Laid-Open Publication No. 7-212353).

BRIEF SUMMARY OF THE INVENTION

In a conventional technique, a user terminal and an authentication system exchange authentication information such as ID and passwords at the time of user authentication through a network (e.g., public line network such as the Internet). In this case, the authentication information may be stolen by a malicious third party penetrating the network, an authorized user, etc. If the user authentication is performed based on such stolen authentication information, the system has no way to determine whether a person to be authenticated is an authentic user or unauthorized user and it is difficult to prevent so-called impersonation.

The present invention was conceived in view of the situations and it is therefore the principal object of the present invention to provide a technique capable of ensuring high security for the data communication through a network to prevent the impersonation.

In an information processing method of the present invention, to address the above problem, a first server and a second server mainly execute the processes which follow. The first server includes a storage unit having stored thereon a user information database that stores identification information and authentication information of a user and a communicating unit that communicates with another apparatus, the first server executing the processes of receiving an authentication request including authentication information of a user with the communicating unit from a predetermined apparatus of a user existing facility coupled through a public line to the first server, checking the authentication information included in the authentication request against the authentication information in the user information database and performing user authentication, sending a user confirmation request including the identification information of the user to a second server in the case where the user authentication is successful, and transmitting predetermined data for utilizing a predetermined commercial product or service to the predetermined apparatus in the user existing facility in the case where a notification of success of user confirmation is received from the second server in response to the user confirmation request.

On the other hand, the second server includes a storage unit having storing thereon an electric power consumer database that stores and correlates identification information of a user, location information of a user facility, and identification information of a measuring apparatus fixed to the user facility to measure an amount of a commercial product or service provided to the user and a meter information database that correlates the identification information of the measuring apparatus with disposition location information thereof and a communicating unit that communicates with another apparatus, the second server executing the processes of receiving the user confirmation request from the first server and checking identification information of the user included in the user confirmation request against the electric power consumer database and identifying location information of the user facility of the user, and receiving with the communicating unit a utilization request for a commercial product or service including the identification information of the measuring apparatus from the measuring apparatus disposed in the user existing facility linked through a dedicated line with the second server, checking the identification information of the measuring apparatus included in the utilization request against the meter information database and identifying disposition location information of the measuring apparatus, and sending a notification of success of user confirmation including the identification information of the user to the first server in the case where the identified disposition location information of the measuring apparatus is checked against the user facility location information identified based on the user confirmation request and both are identical.

In another information processing method of the present invention, a first server includes a storage unit having stored thereon a user information database that stores identification information and authentication information of a user and a communicating unit that communicates with another apparatus, the first server executing the processes of receiving an authentication request including authentication information of a user with the communicating unit from a predetermined apparatus of a user existing facility coupled through a public line to the first server, checking the authentication information included in the authentication request against the authentication information in the user information database and performing user authentication, and sending a user confirmation request including the identification information of the user to a second server in the case where the user authentication is successful; and the second server includes a storage unit having storing thereon an electric power consumer database that stores and correlates identification information of a user, location information of a user facility, and identification information of a measuring apparatus fixed to the user facility to measure an amount of a commercial product or service provided to the user and a meter information database that correlates the identification information of the measuring apparatus with disposition location information thereof and a communicating unit that communicates with another apparatus, the second server executing the processes of receiving the user confirmation request from the first server and checking identification information of the user included in the user confirmation request against the electric power consumer database and identifying location information of the user facility of the user, and receiving with the communicating unit a utilization request for a commercial product or service including the identification information of the measuring apparatus from the measuring apparatus disposed in the user existing facility linked through a dedicated line with the second server, checking the identification information of the measuring apparatus included in the utilization request against the meter information database and identifying disposition location information of the measuring apparatus, and transmitting predetermined data for utilizing a predetermined commercial product or service to the predetermined apparatus in the user existing facility in the case where the identified disposition location information of the measuring apparatus is checked against the user facility location information identified based on the user confirmation request and both are identical.

An information processing system of the present invention is a computer system that includes a first server and a second server. The first server includes a storage unit having stored thereon a user information database that stores identification information and authentication information of a user, a communicating unit that communicates with another apparatus, a confirmation requesting unit that receives an authentication request including authentication information of a user with the communicating unit from a predetermined apparatus of a user existing facility coupled through a public line, that checks the authentication information included in the authentication request against the authentication information in the user information database to perform user authentication, and that sends a user confirmation request including the identification information of the user to a second server in the case where the user authentication is successful, and a service data transmitting unit that transmits predetermined data for utilizing a predetermined commercial product or service to the predetermined apparatus in the user existing facility in the case where a notification of success of user confirmation is received from the second server in response to the user confirmation request. The second server includes a storage unit having storing thereon an electric power consumer database that stores and correlates identification information of a user, location information of a user facility, and identification information of a measuring apparatus fixed to the user facility to measure an amount of a commercial product or service provided to the user and a meter information database that correlates the identification information of the measuring apparatus with disposition location information thereof, a communicating unit that communicates with another apparatus, a user facility identifying unit that receives the user confirmation request from the first server and that checks identification information of the user included in the user confirmation request against the electric power consumer database and identifies location information of the user facility of the user, and a confirmation result notifying unit that receives with the communicating unit a utilization request for a commercial product or service including the identification information of the measuring apparatus from the measuring apparatus disposed in the user existing facility linked through a dedicated line, that checks the identification information of the measuring apparatus included in the utilization request against the meter information database and identifies disposition location information of the measuring apparatus, and that sends a notification of success of user confirmation including the identification information of the user to the first server in the case where the identified disposition location information of the measuring apparatus is checked against the user facility location information identified based on the user confirmation request and both are identical.

Another information processing system of the present invention comprises a first server including a storage unit having stored thereon a user information database that stores identification information and authentication information of a user, a communicating unit that communicates with another apparatus, and a confirmation requesting unit that receives an authentication request including authentication information of a user with the communicating unit from a predetermined apparatus of a user existing facility coupled through a public line, that checks the authentication information included in the authentication request against the authentication information in the user information database and performs user authentication, and that sends a user confirmation request including the identification information of the user to a second server in the case where the user authentication is successful; and the second server including a storage unit having storing thereon an electric power consumer database that stores and correlates identification information of a user, location information of a user facility, and identification information of a measuring apparatus fixed to the user facility to measure an amount of a commercial product or service provided to the user and a meter information database that correlates the identification information of the measuring apparatus with disposition location information thereof, a communicating unit that communicates with another apparatus, a user facility identifying unit that receives the user confirmation request from the first server and that checks identification information of the user included in the user confirmation request against the electric power consumer database and identifies location information of the user facility of the user, and a service data transmitting unit that receives with the communicating unit a utilization request for a commercial product or service including the identification information of the measuring apparatus from the measuring apparatus disposed in the user existing facility linked through a dedicated line, that checks the identification information of the measuring apparatus included in the utilization request against the meter information database and identifies disposition location information of the measuring apparatus, and that transmits predetermined data for utilizing a predetermined commercial product or service to the predetermined apparatus in the user existing facility, in the case where the identified disposition location information of the measuring apparatus is checked against the user facility location information identified based on the user confirmation request and both are identical.

As a result, high security may be ensured for the data communication through a network to prevent the impersonation.

BRIEF DESCRIPTION OF THE SEVERAL VIEWS OF THE DRAWINGS

FIG. 2 is a diagram of an exemplary data configuration of a consumer database of the embodiment;

FIG. 3 is a diagram of an exemplary data configuration of a meter information database of the embodiment;

FIG. 5 is a diagram of an exemplary data configuration of a service user information database of the embodiment;

FIG. 6 is a diagram of an exemplary data configuration of a service utilization history database of the embodiment;

FIG. 15 is a diagram of an exemplary database configuration of an in-home data storage database of the embodiment.

DETAILED DESCRIPTION OF THE INVENTION

Exemplary embodiments of the present invention will now be described with reference to the accompanying drawings.
<First Embodiment>
---System Configuration---

Figure 1:
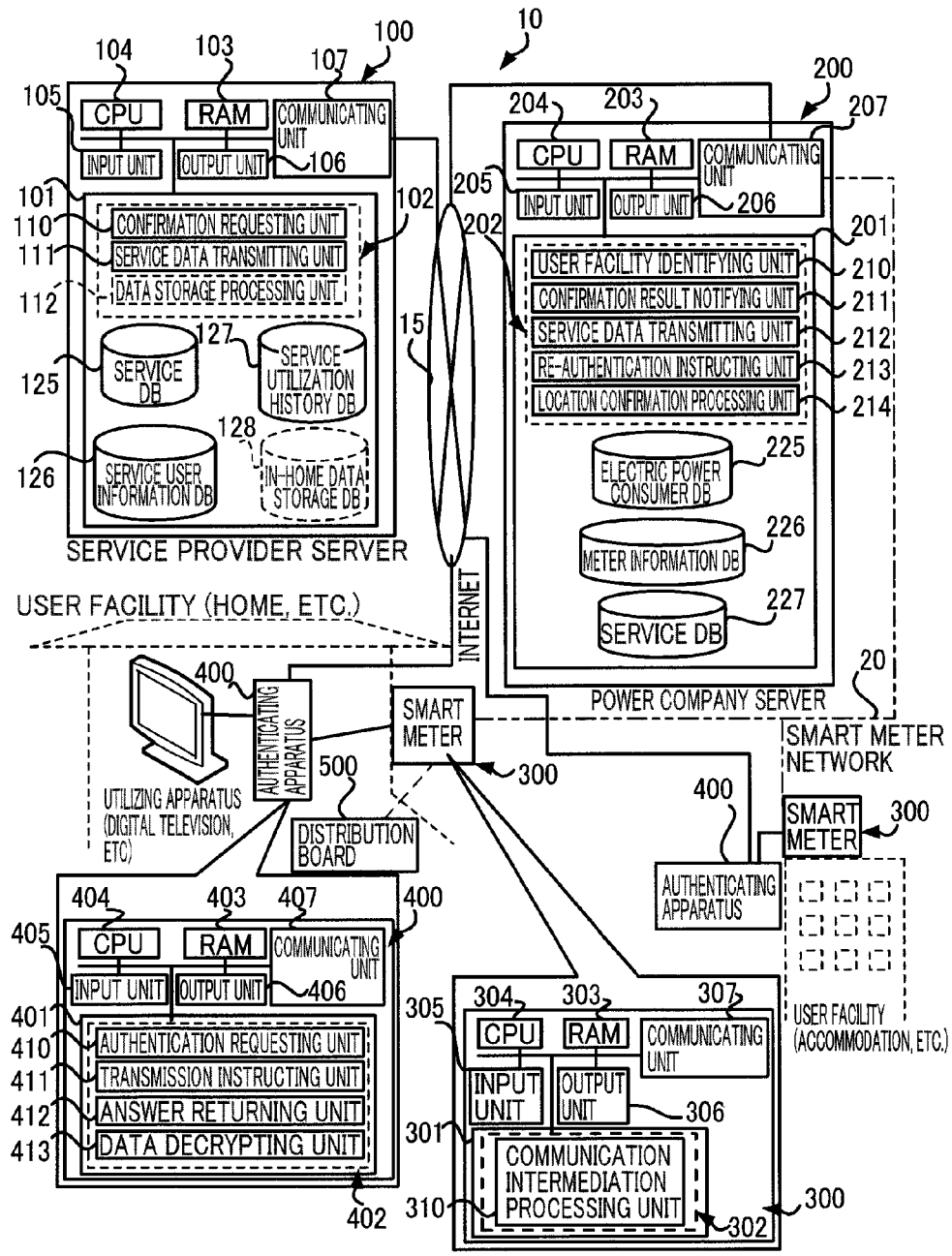
FIG. 1 is a diagram of an exemplary configuration of an information processing system of an embodiment.

An embodiment of the present invention will hereinafter be described in detail with reference to the drawings. FIG. 1 depicts a network configuration including an information processing system 10 of the embodiment. The information processing system 10 (hereinafter, system 10) depicted in FIG. 1 is a computer system capable of ensuring high security for the data communication through a network to prevent impersonation. In the example of the embodiment, a network is made up of the system 10 including a service provider server 100 that is a first server, a power company server 200 that is a second server, and an authenticating apparatus 400 (predetermined apparatus that receives predetermined data for utilizing a predetermined commercial product or service) and a smart meter 300 that is a measuring apparatus fixed to user facilities.

The service provider server 100 may be assumed to be a kind of a server apparatus operated by a content provider to deliver, for example, electronic contents (e.g., data of books, videos, images, illustrations, seal impressions, music, programs, etc.) and data for using the contents (such as key data for descrambling and a password for usage authentication) to the authenticating apparatus 400 of an electric power consumer that is a user. The service provider server 100 is communicably coupled to the authenticating apparatus 400 through an internet 15 that is a public line and a smart meter network 20 that is a dedicated line. The service provider server 100 is also communicably coupled to the power company server 200 through a network such as the internet 15 or LAN.

On the other hand, the power company server 200 is a server apparatus managed by an electric power supplier and may be assumed to be an apparatus communicably linked through the smart meter network 20 that is the dedicated line with the smart meter 300 disposed on an electric power consumer facility=user facility, the authenticating apparatus 400 linked with the smart meters 300, etc. Although an example of the second server is assumed to be the server managed by the electric power supplier as above in the embodiment, naturally, this is not a limitation and it may be assumed that the server is replaced with a server belonging to a professional agent for meter reading operation, a management agent for meter reading data, etc. The power company server 200 is also communicably linked with the service provider server 100 through a network such as the internet or LAN. The smart meter network 20 may be assumed to be, for example, a wired network (e.g., optical fiber) established between a predetermined site (=disposition location of the power company server 200) of the electric power supplier and the user facilities or a wireless network having a communicable area in the vicinity of the user facilities (with base stations and relay stations covering communicable areas to enable communication data to be mutually given/received). In any case, the smart meter network 20 is not a network such as the internet accessed by the general public and is a dedicated network accessed only by apparatuses of the electric power supplier and the electric power consumers.

The smart meter 300 is an automatic meter reading apparatus for electric power used, which is fixedly disposed on the facility of the electric power consumer and is communicably linked with the power company server 200 through the smart meter network 20. Although not particularly described, naturally, the smart meter 300 has a function of electrically coupling to a distribution board 500, etc., of the electric power consumer facility and periodically performing the measurement of electric power used and the automatic transmission of a measured value to the power company server 200 as an automatic meter reading apparatus for electric power used. The smart meter 300 is communicably linked with the authenticating apparatus 400 through a network such as LAN. Although a supervisor of the second server is assumed to be an electric power supplier in the embodiment, the supervisor may also be assumed to be a supplier that performs a supply business of gas, water, chemicals, architectural materials, etc. In such a case, the smart meter 300 acting as the measuring apparatus is a measuring apparatus for a usage amount of a supplied material in a user facility instead of a meter for electric power used.

On the other hand, the authenticating apparatus 400 is integrated with a utilizing apparatus for the commercial product/service utilized by the electric power consumer (e.g., a digital television, a personal computer, a PDA, and an audio device) or is a separate computer apparatus communicably coupled to the utilizing apparatus. The authenticating apparatus 400 is communicably coupled to the smart meter 300 through a suitable network such as LAN. The authenticating apparatus 400 is communicably coupled to the service provider server 100 through the internet 15 and the smart meter network 20 (or the smart meter 300 coupled thereto).

The configurations of the apparatuses included in the exemplary network configuration will then be described. The service provider server 100 is a server apparatus making up the system 10. The service provider server 100 is made up of a storage unit 101, RAM 103, a control unit 104 such as a CPU, a communicating unit 107, etc., coupled to each other through BUS. The storage unit 101 stores a service database 125, a service user information database (user information database) 126, and a service utilization history database 127 described later.

The service provider server 100 reads out a program 102 stored in the storage unit 101 such as a hard disc drive to a volatile memory such as the RAM 103 for execution by the control unit 104. The service provider server 100 may include an input unit 105 such as various keyboards and buttons and an output unit 106 such as a display, which are generally included in a computer apparatus, as needed.

The service provider server 100 has the communicating unit 107 such as NIC (network interface card) responsible for giving/receiving data to/from another apparatus and is communicable with the power company server 200, the smart meter 300, the authenticating apparatus 400, etc.

Description will then be made of functional units configured/retained by the service provider server 100 in the storage unit 101 based on the program 102, for example. The service provider server 100 includes a confirmation requesting unit 110 that receives with the communicating unit 107 an authentication request including authentication information of a user from the authenticating apparatus 400, i.e., a predetermined apparatus in a user existing facility coupled through the internet 15, that checks the authentication information included in the authentication request against authentication information in the user information database 126 and performs user authentication, and that sends a user confirmation request including identification information of the user to the power company server 200 in the case where the user authentication is successful.

The service provider server 100 includes a service data transmitting unit 111 that transmits predetermined data for utilizing the predetermined commercial product or service to the authenticating apparatus 400 in the user existing facility in the case where a notification of success of the user confirmation is received from the power company server 200 in response to the user confirmation request.

In the service database 125 of the storage unit 101, the service provider server 100 may store as the predetermined data for utilizing the predetermined commercial product or service divided data A and divided data B having a data size equal to or smaller than the divided data A, which are acquired by dividing the data making up the predetermined commercial product or the data for providing the predetermined service. The divided data B having a data size equal to or smaller then the divided data A means in other words that the data size is the same as or smaller than the data size of the divided data A.

In this case, preferably, in the case where a notification of success of the user confirmation is received from the power company server 200 in response to the user confirmation request, the service data transmitting unit 111 executes a process of transmitting the divided data A via the internet to the authenticating apparatus 400 in the user existing facility and transmitting the divided data B via the smart meter network to the authenticating apparatus 400 in the user existing facility.

In the service database 125 of the storage unit 101, the service provider server 100 may store as the predetermined data for utilizing the predetermined commercial product or service encrypted data of the data making up the predetermined commercial product or encrypted data of the data for providing the predetermined service.

In this case, preferably, the service data transmitting unit 111 executes a process of transmitting the encrypted data in advance via the internet to the authenticating apparatus 400 in the user existing facility.

In this case, preferably, in the case where a notification of success of the user confirmation is received from the power company server 200 in response to the user confirmation request, the service data transmitting unit 111 executes a process of transmitting decrypting data of the encrypted data via the smart meter network (or via the internet) to the authenticating apparatus 400 in the user existing facility.

The confirmation requesting unit 110 of the service provider server 100 may receive with the communicating unit 107 an authentication request including a utilization service ID indicative of a desired commercial product or service of a user and authentication information of the user from the authenticating apparatus 400 of the user existing facility coupled through the smart meter network 20, may check the authentication information included in the authentication request against the authentication information in the service user information database 126 and performs the user authentication, and may send a user confirmation request including the identification information of the user and the utilization service ID included in the authentication request to the power company server 200 in the case where the user authentication is successful.

In the case where a notification of success of the user confirmation is received from the power company server 200 in response to the user confirmation request, the service data transmitting unit 111 of the service provider server 100 may transmit predetermined data for utilizing a predetermined commercial product or service corresponding to the utilization service ID to the authenticating apparatus 400 in the user existing facility.

The power company server 200 will then be described. The power company server 200 is made up of a storage unit 201, RAM 203, a control unit 204 such as CPU, a communicating unit 207, etc., coupled to each other through BUS. The storage unit 101 stores an electric power consumer database 225 and a meter information database 226 described later.

The power company server 200 reads out a program 202 stored in the storage unit 201 such as a hard disc drive to a volatile memory such as the RAM 203 for execution by the control unit 204. The power company server 200 may include as needed an input unit 205 such as various keyboards and buttons and an output unit 206 such as a display, which are generally included in a computer apparatus.

The power company server 200 has the communicating unit 207 such as NIC (network interface card) responsible for giving/receiving data to/from another apparatus and is communicable with the service provider server 100, the smart meter 300, etc.

Description will then be made of functional units configured/retained by the power company server 200 in the storage unit 201 based on the program 202, for example. The power company server 200 includes a user facility identifying unit 210 that receives the user confirmation request from the service provider server 100 and that checks the identification information of the user included in the user confirmation request against the electric power consumer database 225 and identifies location information of a user facility of the user.

The power company server 200 includes a confirmation result notifying unit 211 that receives with the communicating unit 207 a utilization request for a commercial product or service including identification information of the smart meter 300 from the smart meter 300 disposed in the user existing facility linked through the smart meter network 20, that checks the identification information of the smart meter 300 included in the utilization request against the meter information database 226 and identifies disposition location information of the smart meter 300, and that sends a notification of success of user confirmation including identification information of the user to the service provider server 100 in the case where the identified disposition location information of the smart meter 300 is checked against user facility location information identified based on the user confirmation request and both are identical.

The power company server 200 may include a service data transmitting unit 212 that receives with the communicating unit 207 a utilization request for a commercial product or service including identification information of the smart meter 300 from the smart meter 300 disposed in the user existing facility linked through the smart meter network 20, that checks the identification information of the smart meter 300 included in the utilization request against the meter information database 226 and identifies disposition location information of the smart meter 300, and that transmits predetermined data for utilizing the predetermined commercial product or service to the authenticating apparatus 400 in the user facility in the case where the identified disposition location information of the smart meter 300 is checked against user facility location information identified based on the user confirmation request and both are identical.

In the storage unit 201, the power company server 200 may include a service database 227 that store as the predetermined data for utilizing the predetermined commercial product or service divided data A and divided data B having a data size equal to or smaller than the divided data A, which are acquired by dividing data making up the predetermined commercial product or data for providing the predetermined service. In other words, this is a situation in which the power company server 200 delivers contents in the same way as the service provider server 100.

In this case, preferably, in the case where the disposition location information of the smart meter 300 is checked against the user facility location information identified based on the user confirmation request and both are identical, the service data transmitting unit 212 executes a process of transmitting the divided data A via the internet to the authenticating apparatus 400 in the user existing facility and transmitting the divided data B via the smart meter network to the authenticating apparatus 400 in the user existing facility. In the case where the disposition location information of the smart meter 300 is checked against the user facility location information identified based on the user confirmation request and both are identical, the service data transmitting unit 212 may execute a process of transmitting decrypting data of the encrypted data via the smart meter network (or via the internet) to the authenticating apparatus 400 in the user existing facility.

The power company server 200 may include a re-authentication instructing unit 213 that receives with the communicating unit 207 a utilization request for a commercial product or service including identification information of the smart meter 300 transmitted for a plurality of times from the smart meter 300 linked through the smart meter network 20, that checks the identification information of the smart meter 300 included in the utilization request received at a certain point in time against the meter information database 226 and identifies disposition location information of the smart meter 300, that checks the identification information of the smart meter 300 included in the utilization request received at the next time, after the identified disposition location information of the smart meter 300 is checked against the user facility location information identified based on the user confirmation request and both are identical, against the meter information database 226 and identifies the disposition location information of the smart meter 300, and that sends an instruction for retransmission of the authentication request to the authenticating apparatus 400 in the user existing facility by determining that the user has moved from the user facility in the case where the identified disposition location information of the smart meter 300 is checked against the user facility location information identified based on the user confirmation request and both are not identical. The re-authentication instructing unit 213 may be included in the confirmation result notifying unit 211 or the service data transmitting unit 212.

The power company server 200 may include a location confirmation processing unit 214 that receives with the communicating unit 207 a utilization request for a commercial product or service including identification information of the smart meter 300 transmitted from the smart meter 300 linked through the smart meter network 20, that checks the identification information of the smart meter 300 included in the received utilization request against the meter information database 226 and identifies disposition location information of the smart meter 300, that transmits a message for inquiring the location of the user facility or the disposition location of the smart meter 300 to the authenticating apparatus 400 in the user existing facility by determining that the user is accessing from other than the user facility in the case where the identified disposition location information of the smart meter 300 is checked against the user facility location information identified based on the user confirmation request and both are not identical, that checks an answer about the location of the user facility returned from the authenticating apparatus 400 against data about the user in the electric power consumer database 225 or checks an answer about the disposition location of the smart meter 300 against data about the user in the meter information database 226 and performs the identity confirmation of the user, and that executes the process same as the case that the disposition location information of the smart meter 300 is identical to the location information of the user facility identified based on the user confirmation request (the process by the confirmation result notifying unit 211 or the service data transmitting unit 212) in the case where the identity confirmation is successful. The location confirmation processing unit 214 may be included in the confirmation result notifying unit 211 or the service data transmitting unit 212.

The confirmation result notifying unit 211 may receive with the communicating unit 207 a utilization request including the identification information of the smart meter 300 and a utilization service ID indicative of a desired commercial product or service of a user from the smart meter 300 disposed in the user existing facility coupled through the smart meter network 20, may check the identification information of the smart meter 300 included in the utilization request against the meter information database 226 and identifies the disposition location information of the smart meter 300, and may execute a process of sending a notification of success of the user confirmation including the identification information of the user and the utilization service ID to the service provider server 100 in the case where the identified disposition location information of the smart meter 300 is checked against the user facility location information identified based on the user confirmation request and both are identical.

The authenticating apparatus 400 will then be described. The authenticating apparatus 400 is integrated with a utilizing apparatus for the commercial product/service such as electronic contents utilized by the electric power consumer (e.g., a digital television, a personal computer, PDA, and an audio device) or is a separate computer apparatus communicably coupled to the utilizing apparatus. Therefore, it is assumed that the authenticating apparatus 400 is disposed not only in a user facility such as user's home registered in advance, but also in a user's destination facility such as an accommodation facility. The authenticating apparatus 400 is made up of a storage unit 401, RAM 403, a control unit 404 such as a CPU, a communicating unit 407, etc., coupled to each other through BUS. The authenticating apparatus 400 stores in the storage unit 401 screen data of a user interface, etc.

The authenticating apparatus 400 reads out a program 402 stored in the storage unit 401 that is a nonvolatile storage device to a volatile memory such as the RAM 403 for execution by the control unit 404. The authenticating apparatus 400 includes an input unit 405 such as various keyboards and buttons and an output unit 406 such as a display, which are generally included in a computer apparatus, as needed. The authenticating apparatus 400 has the communicating unit 407 such as NIC (network interface card) responsible for giving/ receiving data to/from another apparatus and is communicable with the service provider server 100, the power company server 200, the smart meter 300, etc. In this embodiment, the communication with the power company server 200 is performed through the smart meter 300.

Description will then be made of functional units configured/retained by the authenticating apparatus 400 in the storage unit 401 based on the program 402, for example. The authenticating apparatus 400 includes an authentication requesting unit 410 that accepts a utilization request for a commercial product/service such as electronic contents from a user through the input unit 405, that calls and displays input screen data of authentication information of the user (such as ID and password) from the storage unit 401 onto the output unit 406, and that transmits an authentication request including the authentication information of the user accepted by the input screen to the service provider server 100 through the communicating unit 407. The authentication requesting unit 410 may accept the specification of the utilization service ID indicative of a desired commercial product or service of the user through the input screen and may include the utilization service ID into the authentication request. The authentication requesting unit 410 may accept an instruction for re-transmission of the authentication request from the power company server 200, may call and display the input screen data of the authentication information again on the output unit 406, and may transmit an authentication request including the authentication information of the user accepted by this input screen to the service provider server 100 through the communicating unit 407.

The authenticating apparatus 400 includes a transmission instructing unit 411 that instructs the smart meter 300 through the communicating unit 407 to transmit a utilization request for a commercial product or service including the identification information of the smart meter (also including, e.g., the utilization service ID accepted by the input screen) to the power company server 200.

The authenticating apparatus 400 includes an answer returning unit 412 that receives from the power company server 200 a message for inquiring the location of the user facility or the disposition location of the smart meter 300, that reads and displays screen data for inputting an answer about the location of the user facility from the storage unit 401 onto the output unit 406 in response to the message, that accepts an answer input from the user, and that returns the accepted answer data to the power company server 200.

The authenticating apparatus 400 includes a data decrypting unit 413 that receives the divided data A via the internet from the service provider server 100, that receives the divided data B via the smart meter network (or the smart meter coupled thereto) from the service provider server 100, that combines the divided data A and the divided data B to generate data making up a predetermined commercial product or data for providing a predetermined service, and that outputs the generated data to the output unit 406. Naturally, the data decrypting unit 413 may output the generated data to the utilizing apparatus such as a digital television.

The data decrypting unit 413 may receive the divided data A via the internet from the power company server 200, may receive the divided data B via the smart meter network (or the smart meter coupled thereto) from the power company server 200, may combine the divided data A and the divided data B and generate data making up a predetermined commercial product or data for providing a predetermined service, and may output the generated data to the output unit 406. Naturally, the data decrypting unit 413 may output the generated data to the utilizing apparatus such as a digital television.

The data decrypting unit 413 may receive and store the encrypted data via the internet from the service provider server 100 into the storage unit 401, may receive the decrypting data via the smart meter network (or the smart meter coupled thereto) (or via the internet) from the service provider server 100, may decrypt the encrypted data in the storage unit 401 with the decrypting data and generate data making up a predetermined commercial product or data for providing a predetermined service, and may output the generated data to the output unit 406. Naturally, the data decrypting unit 413 may output the generated data to the utilizing apparatus such as a digital television.

The data decrypting unit 413 may receive and store the encrypted data via the internet from the service provider server 100 into the storage unit 401, may receive the decrypting data via the smart meter network (or the smart meter coupled thereto) (or via the internet) from the power company server 200, may decrypt the encrypted data in the storage unit 401 with the decrypting data and generate data making up a predetermined commercial product or data for providing a predetermined service, and may output the generated data to the output unit 406. Naturally, the data decrypting unit 413 may output the generated data to the utilizing apparatus such as a digital television.

On the other hand, the smart meter 300 is made up of a control unit 304 such as CPU, a storage unit 301, RAM 303, a communicating unit 307 coupled to each other through BUS. The storage unit 301 at least stores a meter ID as the identification information of the smart meter 300. The smart meter 300 reads out a program 302 stored in the storage unit 301 such as a nonvolatile storage unit to a volatile memory such as the RAM 303 for execution by the control unit 304. The smart meter 300 includes an input unit 305 such as various keyboards and buttons and an output unit 306 such as a display, which are generally included in a computer apparatus, as needed. The communicating unit 307 is NIC (network interface card), etc., responsible for giving/receiving data to/from the service provider server 100 and the power company server 200. The smart meter 300 includes a communication intermediation processing unit 310 that receives an instruction from the authenticating apparatus 400 to transmit the data necessary for the service provider server 100 and the power company server 200 through the smart meter network 20 and to transfer the data received through the smart meter network 20 from the service provider server 100 and the power company server 200 to the authenticating apparatus 400, as a functional unit configured/retained in the storage unit 301 based on the program 302, for example. If communication protocols are different between the smart meter network 20 and the network between the smart meter 300 and the authenticating apparatus 400, the communication intermediation processing unit 310 may have a protocol conversion function to perform protocol conversion of communication data.

The functional units of the service provider server 100, the power company server 200, the smart meter 300, and the authenticating apparatus 400 described above may be implemented as hardware, and the functional units may be implemented as programs stored in suitable storage units such as memories and HDD (hard disk drives) in the apparatuses. In this case, the control unit such as CPU of each of the apparatuses reads out from the storage unit and executes the relevant program in accordance with execution of the program.

---Exemplary Data Configurations---

Next, exemplary data configurations of databases, etc., will be described that are utilized by the service provider server 100, the power company server 200, etc., of the embodiment.

FIG. 2 depicts an exemplary data configuration of the electric power consumer database 225 of the embodiment. The electric power consumer database 225 is a database storing identification information of users, location information of user facilities, and identification information of measuring apparatuses fixed to the user facilities to measure amounts of commercial products or services provided to the users in a correlated manner and is a group of records using, for example, an electric power consumer ID as a key to correlate data such as a name, address, and telephone number of an electric power consumer, a consuming location (=meter disposition location) indicative of a location of a user facility, and a meter ID of the smart meter 300 fixed to the user facility.

FIG. 3 depicts an exemplary data configuration of the meter information database 226 of the embodiment. The meter information database 226 is a database correlating meter ID, i.e., identification information of the smart meters 300 and the disposition location information thereof and is a group of records using, for example, a meter ID as a key to correlate data such as meter device information indicative of a type, etc., of a meter, a meter disposition location ID uniquely identifying a meter disposition location, and a meter disposition address. The meter information database 226 or the electric power consumer database 225 stores the addresses of the smart meters 300 in the smart meter network 20, for example, and is utilized as a destination of data transmission.

Figure 4:
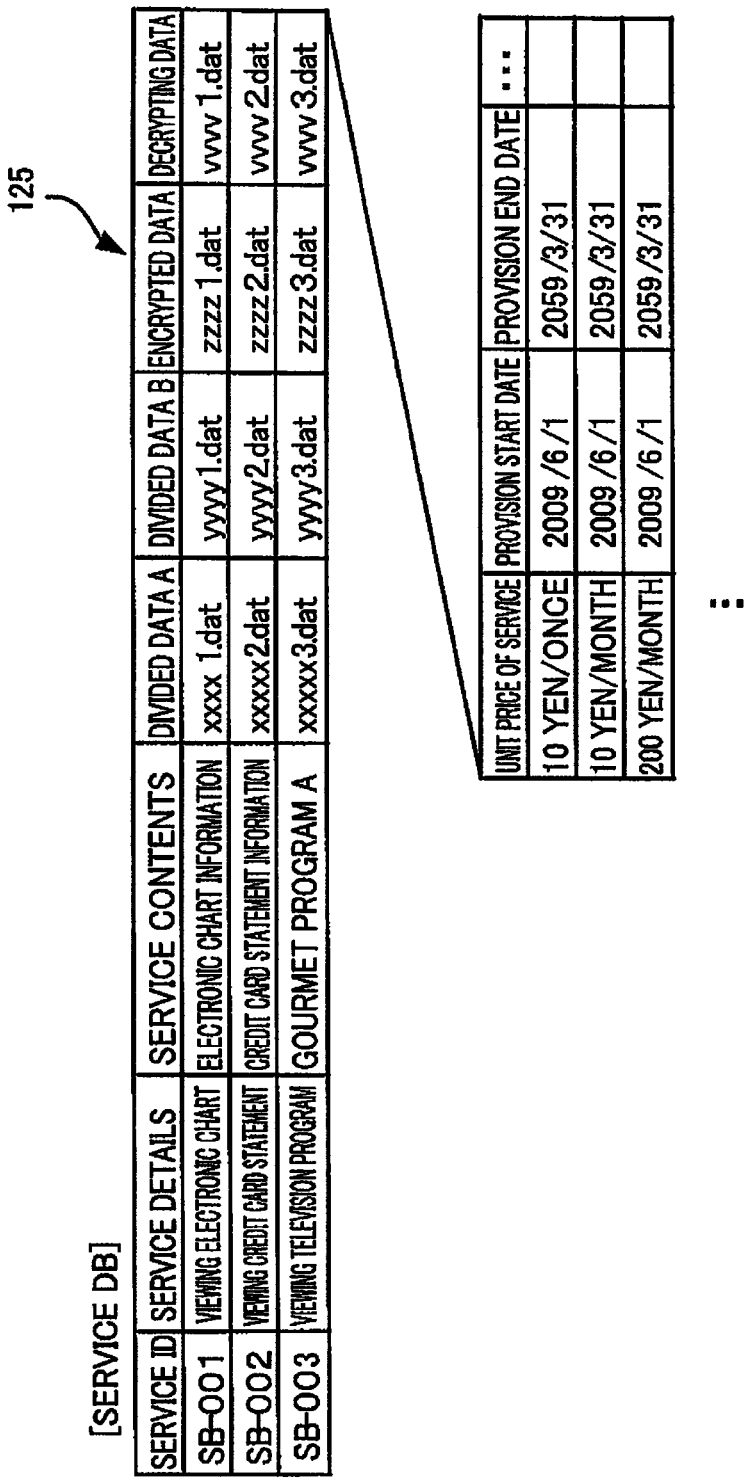
FIG. 4 is a diagram of an exemplary data configuration of a service database of the embodiment.

FIG. 4 depicts an exemplary data configuration of the service database 125 of the embodiment. The service database 125 is a database storing information of commercial products and services provided to a user by the service provider server 100. The service database 125 is a group of records using, for example, a service ID as a key to correlate data such as details of service, contents, a unit price, a provision start date, and a provision end date. The service database may also be called content database. This means that the service database is a database storing data of electronic contents (e.g., data of books, videos, images, illustrations, seal impressions, music, programs, etc.) that are predetermined commercial products and data for utilization thereof (key data for descrambling, password for utilization authentication, etc.) as the data of contents. The service database 125 also acting as the content database also stores data such as the divided data A, the divided data B, the encrypted data, and the decrypting data of the contents data in correlation with the service ID. A situation can also be assumed where the service database 125 is stored as the service database 227 in the storage unit 201 in the power company server 200.

FIG. 5 depicts an exemplary data configuration of the service user information database 126 of the embodiment. The service user information database 126 is a database storing the identification information and the authentication information for users=electric power consumers subscribing to a service provider, and is a group of records using, for example, user ID uniquely identifying a user as a key to correlate a password, a name, address, and telephone number of a user, an electronic power consumer ID, a utilization service ID indicative of contracted commercial product/service, etc., a utilization service password necessary for utilizing the commercial product/service, etc., a utilization registration date that is a date of utilization contract of the commercial product/service, etc., a utilization start date of the commercial product/service, etc., a utilization end date, a method of payment of the usage fee of the commercial product/service, etc., and a debit account number of a financial institution for paying the usage fee.

FIG. 6 depicts an exemplary data configuration of the service utilization history database 127 of the embodiment. The service utilization history database 127 is a database storing history information of commercial products/services utilized by users and is a group of records using, for example, a usage date and a user ID as a key to correlate data such as a utilization service ID indicative of a utilized commercial product/service, a utilization start time, a utilization end time, a meter ID indicative of the smart meter 300 disposed in a user facility when the commercial product/service is utilized, a meter disposition location ID, a smart meter network key, and an internet key. The smart meter network key and the internet key are those used when the commercial product/service, etc., are utilized and it may be assumed that the smart meter network key and the internet key are the divided data B and the divided data A, respectively. Alternatively, it may also be assumed that the smart meter network key and the internet key are the decrypting data (in this case, it is assumed that the decrypting data has been transmitted to the authenticating apparatus 400 through the routes via the smart meter network 20 and the internet 15).

First Process Procedure Example

Actual procedures of the information processing method in the embodiment will hereinafter be described based on the figures. Various operations described below corresponding to the information processing method are implemented by a program read out to and executed in the RAM of the service provider server 100, the power company server 200, the smart meter 300, the authenticating apparatus 400, etc. The program is made up of codes for performing the various operations described below.

Figure 7:
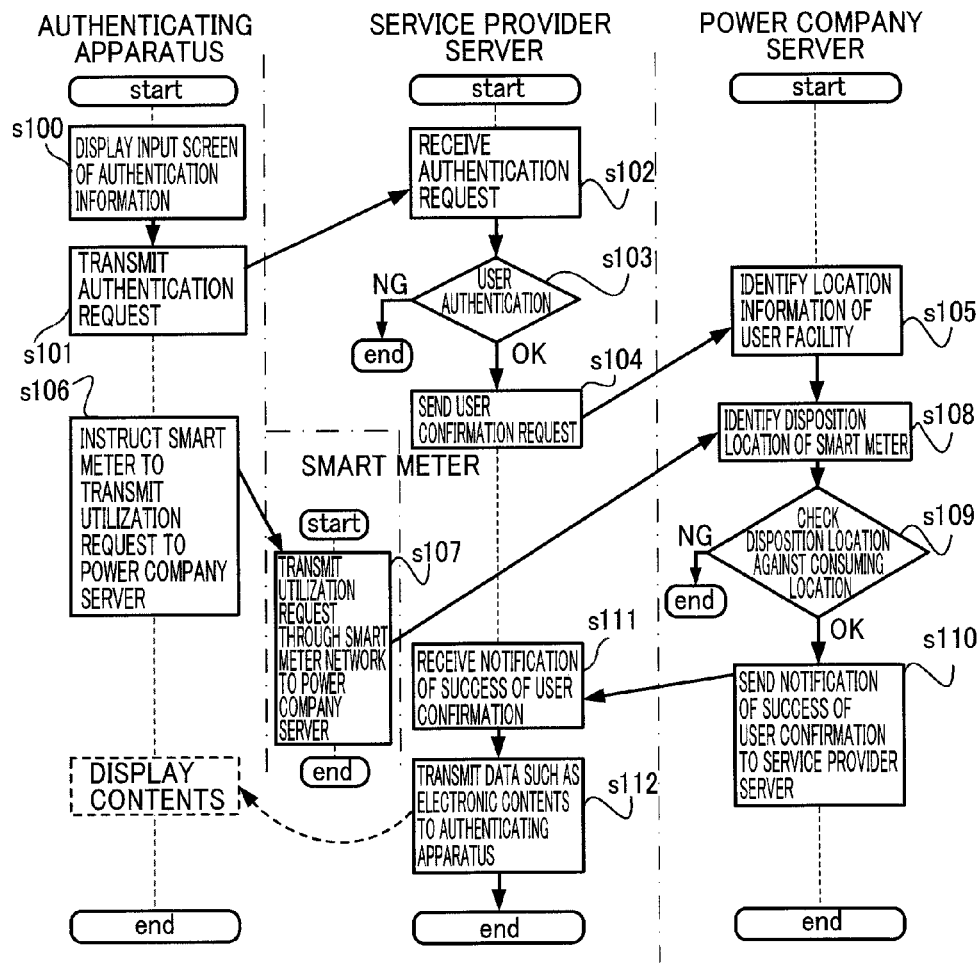
FIG. 7 is a diagram of a first process flow example of an information processing method of the embodiment.

FIG. 7 depicts a first process flow example of the information processing method of the embodiment. It is assumed that a user is an electric power consumer and wants to utilize electronic contents, etc., provided by a service provider. The user is assumed to be in the user's home=user facility, which is the consuming location registered at the time of contract with an electric power supplier. The user's home is equipped with a digital television and the digital television is coupled to the authenticating apparatus 400.

The authentication requesting unit 410 of the authenticating apparatus 400 accepts a utilization request for a commercial product/service such as electronic contents from the user, calls and displays the input screen data of the authentication information of the user (such as ID and password) from the storage unit 401 onto the output unit 406 or the utilizing apparatus such as the digital television coupled thereto (s100). The user views this input screen and enters a set of the user ID and password=authentication information with the input unit 405.

The authentication requesting unit 410 of the authenticating apparatus 400 accepts the authentication information of the user with the input unit 405 through the input screen and transmits an authentication request including the authentication information through the communicating unit 407 to the service provider server 100 via the internet, for example (s101). The authentication request may include a utilization service ID (accepted through the input screen from the user) indicative of the desired commercial product or service of the user.

On the other hand, the confirmation requesting unit 110 of the service provider server 100 receives the authentication request with the communicating unit 107 from the authenticating apparatus 400 in the user existing facility=user's home via the internet 15 (s102). The confirmation requesting unit 110 checks the utilization ID and the password, i.e., the authentication information included in the authentication request against the user ID and the password stored in the user information database 126 and performs the user authentication (s103). If the user authentication is successful (s103: OK), the confirmation requesting unit 110 sends to the power company server 200 a user confirmation request including an electric power consumer ID (acquired by using the user ID as a key to search the user information database 126) as the identification information of the user (s104). The user confirmation request may include the utilization service ID included in the authentication request. On the other hand, in the case where the user authentication fails (s103: NG), a notification of failure of the authentication is returned to the authenticating apparatus 400 to terminate the process.

The user facility identifying unit 210 of the power company server 200 receives the user confirmation request from the service provider server 100, checks the electric power consumer ID, i.e., the identification information of the user included in the user confirmation request against the electric power consumer database 225 and identifies data of "consuming location" as the location information of the user facility of the user (s105). For example, in the case where the electric power consumer ID of the user is "J-001", "Kanagawa-Ken xxxxx" may be identified as the data of the consuming location.

On the other hand, the transmission instructing unit 411 of the authenticating apparatus 400 instructs the smart meter 300 fixedly disposed on the user's home through the communicating unit 407 to transmit a utilization request for a commercial product or service including the meter ID, i.e., the identification information of the smart meter 300 (also including, e.g., the utilization service ID accepted by the input screen at step s101) to the power company server 200 (s106). The transmission instructing unit 411 may instruct the smart meter 300 to transmit the utilization request to the power company server 200 at regular intervals, for example.

The communication intermediation processing unit 310 of the smart meter 300 receives the instruction and transmits the utilization request to the power company server 200 via the smart meter network 20 (s107). If the communication protocols are different between the smart meter network 20 and the network between the smart meter 300 and the authenticating apparatus 400, the communication intermediation processing unit 310 may have a protocol conversion function to perform protocol conversion of communication data. The protocol conversion function may employ an existing application or hardware.

The confirmation result notifying unit 211 of the power company server 200 receives with the communicating unit 207 the utilization request including the meter ID, i.e., the identification information of the smart meter 300 from the smart meter 300, checks the meter ID of the smart meter 300 included in the utilization request against the meter information database 226 and identifies the disposition location information of the smart meter 300 (s108). The utilization request may include the utilization service ID. In the case where the meter ID is "M-001", "Kanagawa-Ken xxxxx" may be identified as the meter disposition location information.

The confirmation result notifying unit 211 checks the identified disposition location information "Kanagawa-Ken xxxxx" of the smart meter 300 against the location information=consuming location "Kanagawa-Ken xxxxx" of the user facility identified based on the user confirmation request at step s105 (s109). In the case where both are identical in this check (s109: OK), the confirmation result notifying unit 211 sends a notification of success of the user confirmation including the electric power consumer ID, i.e., the identification information of the user to the service provider server 100 (s110). The notification of success may include the utilization service ID. On the other hand, in the case where both are not identical in the check at step s106 (s109: NG), the confirmation result notifying unit 211 sends a notification of failure of the user confirmation including the electric power consumer ID, i.e., the identification information of the user to the service provider server 100 to terminate the process. S109 is a process of performing the location confirmation.

Alternatively, in the case where the notification of success of the user confirmation is received from the power company server 200 (s111), the service data transmitting unit 111 of the service provider server 100 reads and transmits the data such as the electronic contents from the service database 125 to the authenticating apparatus 400 of the user's home that is the user existing facility (s112). The service data transmitting unit 111 uses the electric power consumer ID (e.g., "J-001") included in the notification of success as a key to identify the utilization service ID (e.g., "SB-001") in the service user information database 126 and transmits to the authenticating apparatus 400 the data of "service contents" extracted from the service database 125 ("electronic chart" extracted from the record with the service ID of "DB-001") by using this utilization service ID as a key.

Second Process Procedure Example

Figure 8:
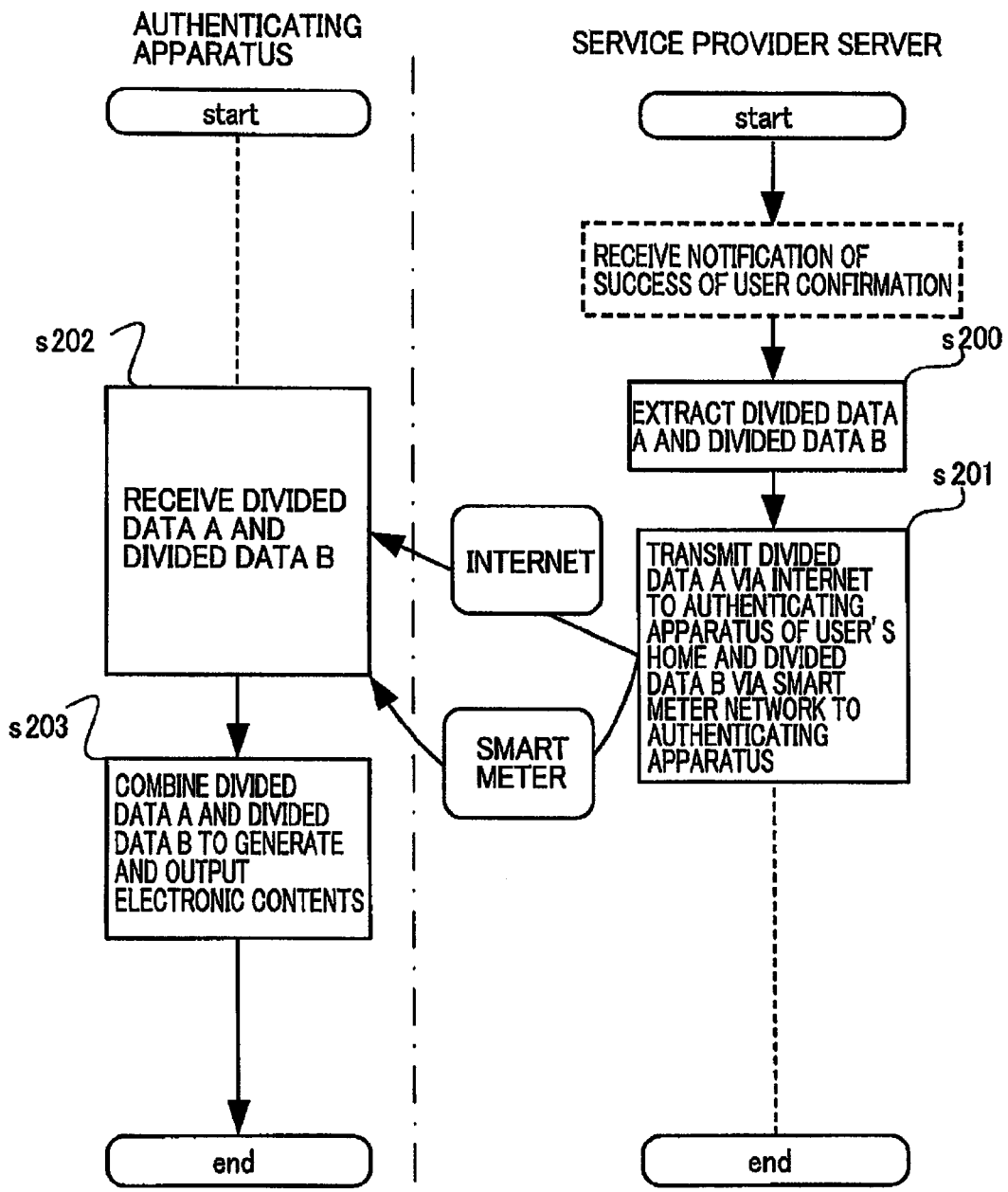
FIG. 8 is a diagram of a second process flow example of the information processing method of the embodiment.

FIG. 8 depicts a second process flow example of the information processing method of the embodiment. A process will then be described for the case of sending divided data such as the electronic contents through different routes to the authenticating apparatus 400 at the time of step s112 in the first process procedure example. It is assumed that the service data transmitting unit ill of the service provider server 100 receives the notification of success of the user confirmation from the power company server 200. In this case, the service data transmitting unit 111 extracts the divided data A and the divided data B from the service database 125 (e.g., the data are extracted from the record with the service ID of "SB-001") (s200).

The service data transmitting unit 111 transmits the divided data A via the internet to the authenticating apparatus 400 of the user existing facility=user's home and transmits the divided data B via the smart meter network to the authenticating apparatus 400 (s201).

On the other hand, the data decrypting unit 413 of the authenticating apparatus 400 receives the divided data A via the internet and the divided data B via the smart meter network (or the smart meter coupled thereto) from the service provider server 100 (s202). The data decrypting unit 413 combines the divided data A and the divided data B and generates the data of "electronic chart information" that is the electronic contents and outputs the generated data to the output unit 406 or the utilizing apparatus such as a digital television coupled thereto (s203). An existing data dividing technology may be employed for a technique of dividing the data such as electronic contents into the divided data A and B that may be combined later.

Third Process Procedure Example

Figure 9:
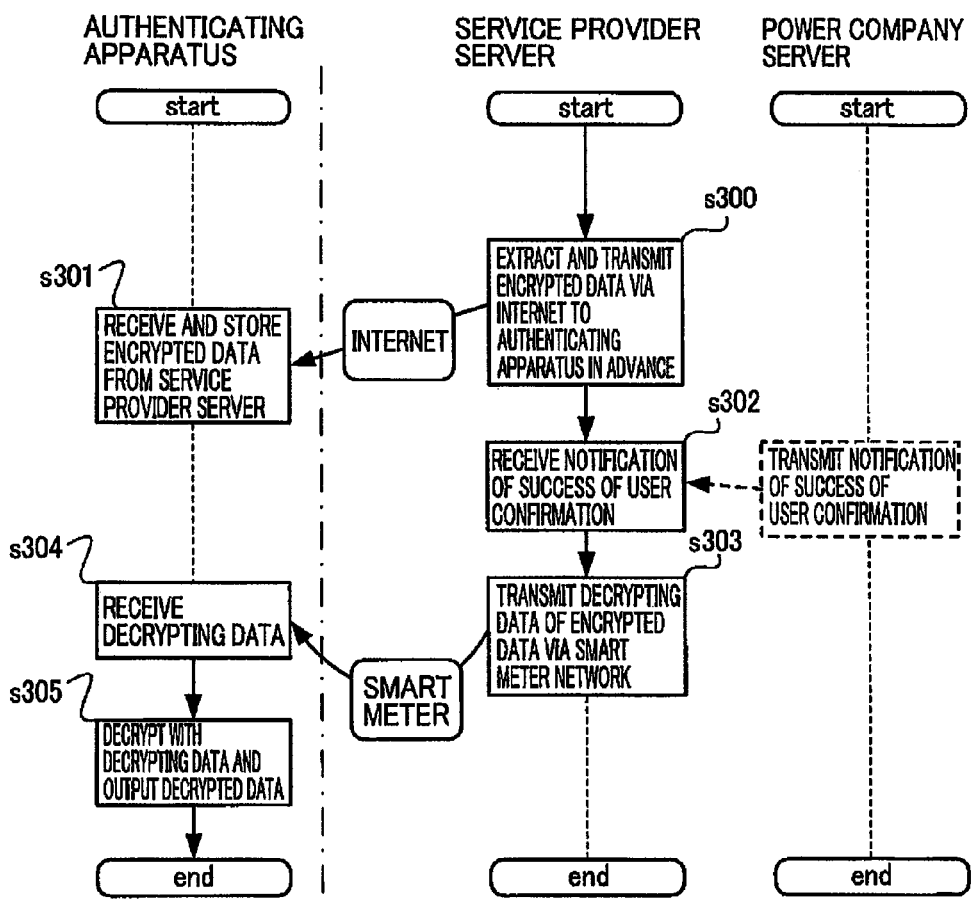
FIG. 9 is a diagram of a third process flow example of the information processing method of the embodiment.

FIG. 9 depicts a third process flow example of the information processing method of the embodiment. A process will then be described for the case of sending data acquired by encrypting the data such as electronic contents to the authenticating apparatus 400 in advance and decrypting the data by using the decrypting data on the user side. In this case, the service data transmitting unit 111 extracts and transmits the encrypted data from the service database 125 to the authenticating apparatus 400 via the internet in advance (s300). In this step, the service data transmitting unit 111 uses, for example, the electric power consumer ID (e.g., "J-002") included in the notification of success as a key to identify the utilization service ID (e.g., "SB-003") from the service user information database 126 and uses this utilization service ID as a key to extract the "encrypted data" from the service database 125 (encrypted data of "gourmet program A" extracted from the record with the service ID of "SB-003"). An example of the encrypted data of data such as electronic contents may be assumed to be scrambled data of television programs, movies, etc. Specifically, it may easily be assumed that the encrypted data are push-type scrambled contents continuously delivered from the service provider server 100 to the user's authenticating apparatus 400.

On the other hand, the data decrypting unit 413 of the authenticating apparatus 400 receives the encrypted data via the internet from the service provider server 100 and stores the encrypted data into the storage unit 401 in advance (s301).

In the case where the notification of success of the user confirmation is received from the power company server 200 in response to the user confirmation request (s302), the service data transmitting unit 111 reads and transmits the decrypting data of the encrypted data (e.g., the encrypted data of "gourmet program A") from the service database 125 to the authenticating apparatus 400 via the smart meter network (or via the internet) (s303). If the encrypted data is scrambled data, the decrypting data is key data for descrambling.

On the other hand, the data decrypting unit 413 of the authenticating apparatus 400 receives the decrypting data via the smart meter network (or the smart meter coupled thereto) (or via the internet) from the service provider server 100 (s304). The data decrypting unit 413 decrypts the encrypted data in the storage unit 401 with the decrypting data to generate, for example, the scrambled "gourmet program A" and outputs the generated data to the output unit 406 or the utilizing apparatus such as the digital television coupled thereto (s305). Naturally, it is assumed that the authenticating apparatus 400 preliminarily includes in the storage unit 401 a program for the descrambling process of such electronic contents and may execute the program.

Fourth Process Procedure Example

Figure 10:
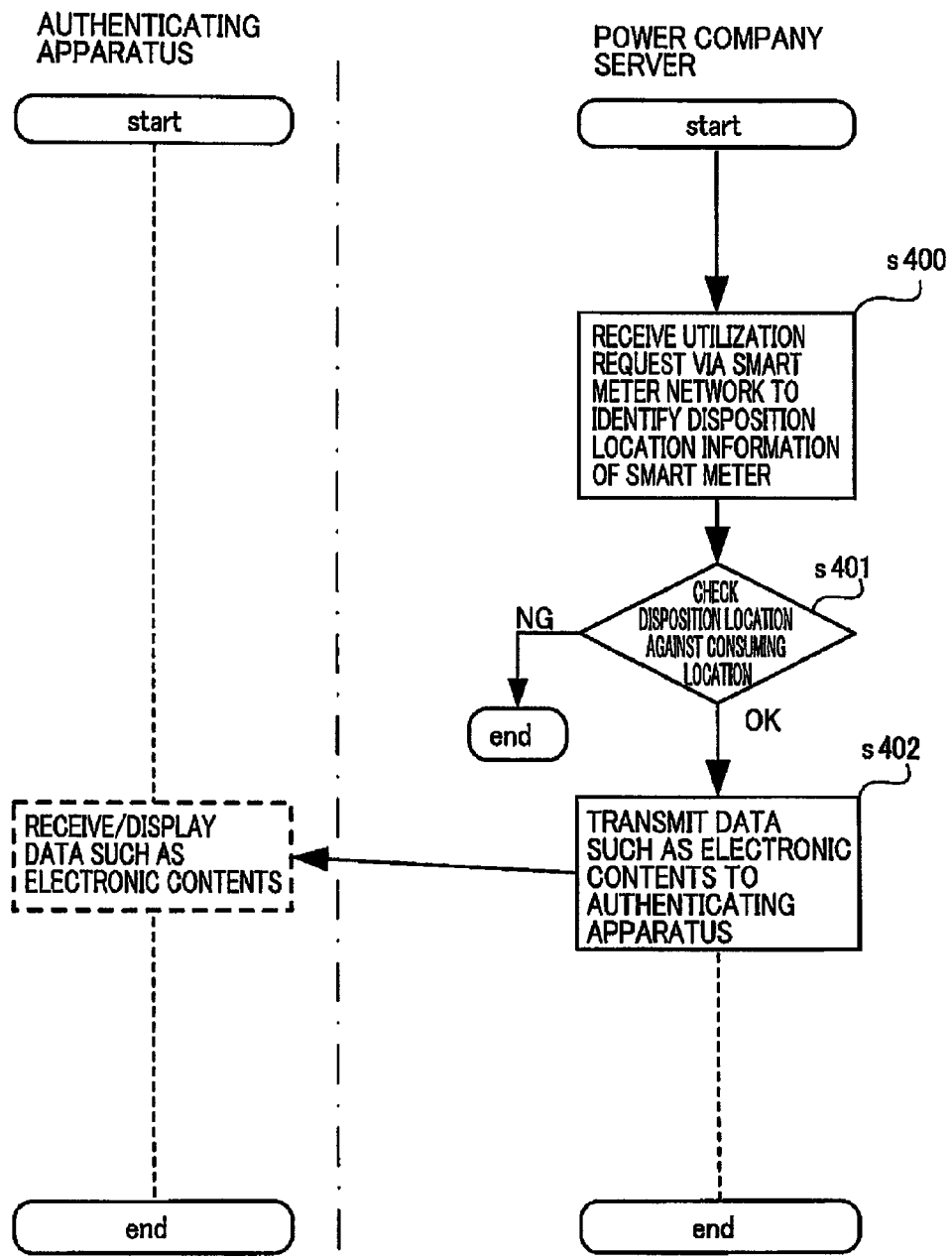
FIG. 10 is a diagram of a fourth process flow example of the information processing method of the embodiment.

FIG. 10 depicts a fourth process flow example of the information processing method of the embodiment. A process will then be described for the case of directly transmitting a predetermined data for utilizing a predetermined commercial product or service from the power company server 200 to the authenticating apparatus 400. The details overlapping with the first process procedure will not be described. In this case, the power company server 200 includes the service database 227 in the storage unit 201. In this situation, the power company server 200 performs the content delivery in the same way as the service provider server 100.

The service data transmitting unit 212 of the power company server 200 receives the utilization request with the communicating unit 207 from the smart meter 300 through the smart meter network 20, checks the meter ID, i.e., the identification information of the smart meter 300 included in the utilization request against the meter information database 226 and identifies the disposition location information of the smart meter 300 (s400).

The service data transmitting unit 212 checks the disposition location information of the smart meter 300 identified at step s400 against the information of the consuming location identified based on the user confirmation request (information identified as the location information of the user facility related to the user by the user facility identifying unit 210 of the power company server 200 checking the electric power consumer ID included in the user confirmation request received by the service provider server 100 against the electric power consumer database 225 as described at step s105 of the first process procedure) and, in the case where both are identical (s401: OK), the service data transmitting unit 212 reads data such as electronic contents as the predetermined data for utilizing the predetermined commercial product or service (in the same procedure as the process additionally described for step s112) and transmits the data to the authenticating apparatus 400 (s402).

On the other hand, in the case where both are not identical in the check at step s401 (s401: NG), for example, a notification of failure of the user confirmation is sent through the smart meter 300 to the authenticating apparatus 400 to terminate the process.

Fifth Process Procedure Example

Figure 11:
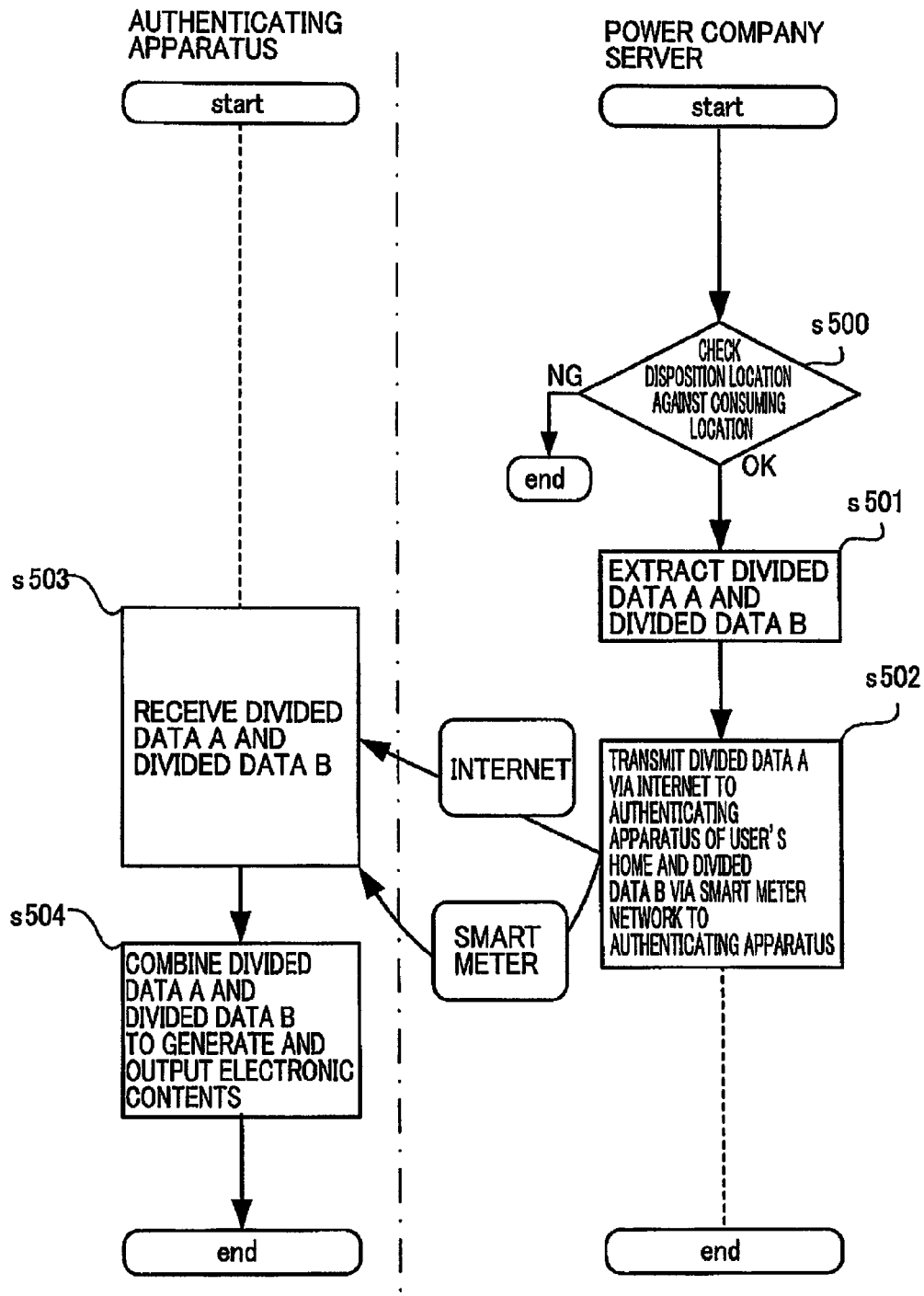
FIG. 11 is a diagram of a fifth process flow example of the information processing method of the embodiment.

FIG. 11 depicts a fifth process flow example of the information processing method of the embodiment. A process will then be described for the case of applying the process same as the second process procedure example to the situation of the fourth process procedure. It is assumed that the power company server 200 includes the service database 227 in the storage unit 201. It is also assumed that, in response to the utilization request from the smart meter 300, the disposition location information of the smart meter 300 has been identified by checking the meter ID, i.e., the identification information of the smart meter 300 included in the utilization request against the meter information database 226. It is also assumed that the information of the consuming location has been identified as the location information of the user facility related to the user by the user facility identifying unit 210 of the power company server 200 checking the electric power consumer ID included in the user confirmation request received by the service provider server 100 against the electric power consumer database 225 as described at step s105 of the first process procedure.

In this case, the service data transmitting unit 212 of the power company server 200 checks the disposition location information of the smart meter 300 against the information of the consuming location, i.e., the location information of the user facility identified based on the user confirmation request and, in the case where both are identical (s500: OK), the service data transmitting unit 212 reads the divided data A and the divided data B from the service database 227 (in the same procedure as the process at step s200) (s501), transmits the divided data A via the internet to the authenticating apparatus 400 and transmits the divided data B via the smart meter network to the authenticating apparatus 400 (s502). On the other hand, in the case where both are not identical in the check at step s500 (s500: NG), for example, a notification of failure of the user confirmation is sent through the smart meter 300 to the authenticating apparatus 400 to terminate the process.

On the other hand, the data decrypting unit 413 of the authenticating apparatus 400 receives the divided data A via the internet from the power company server 200 and receives the divided data B via the smart meter network (or the smart meter coupled thereto) from the power company server 200

(s503). The data decrypting unit 413 combines the divided data A and the divided data B and generates the data making up the predetermined commercial product or data for providing the predetermined service, and outputs the generated data to the output unit 406 or the utilizing apparatus such as a digital television coupled thereto (s504).

Sixth Process Procedure Example

Figure 12:
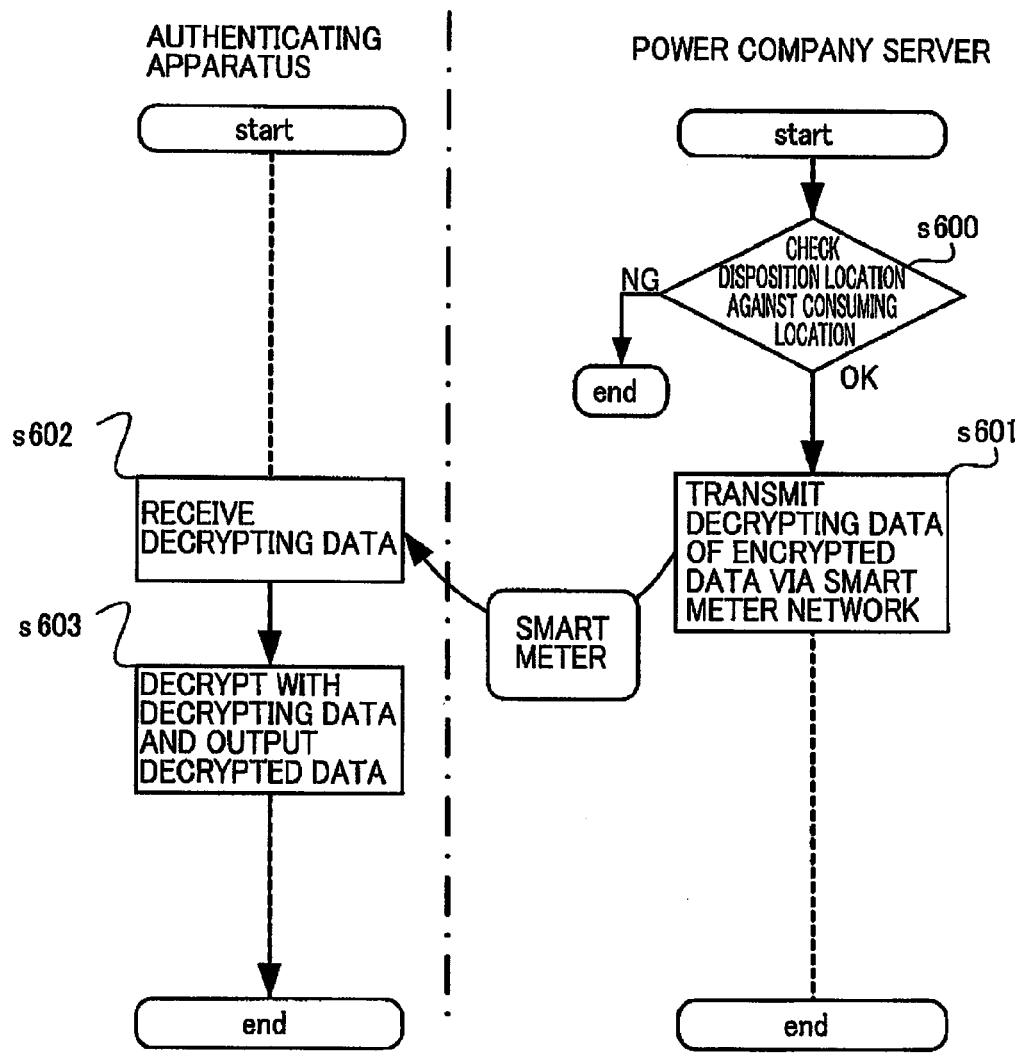
FIG. 12 is a diagram of a sixth process flow example of the information processing method of the embodiment.

FIG. 12 depicts a sixth process flow example of the information processing method of the embodiment. A process will then be described for the case of applying the process same as the third process procedure example to the situation of the fourth process procedure. It is assumed that the power company server 200 includes the service database 227 in the storage unit 201. It is also assumed that, in response to the utilization request from the smart meter 300, the disposition location information of the smart meter 300 has been identified by checking the meter ID, i.e., the identification information of the smart meter 300 included in the utilization request against the meter information database 226. It is also assumed that the information of the consuming location has been identified as the location information of the user facility related to the user by the user facility identifying unit 210 of the power company server 200 checking the electric power consumer ID included in the user confirmation request received by the service provider server 100 against the electric power consumer database 225 as described at step s105 of the first process procedure.

It is assumed that, the service data transmitting unit 212 of the power company server 200 (or the service data transmitting unit 111 of the service provider server 100) has already transmitted the encrypted data to the authenticating apparatus 400 (as in the case of step s300). It is also assumed that the data decrypting unit 413 of the authenticating apparatus 400 has received and stored the encrypted data via the internet into the storage unit 401.

In this case, the service data transmitting unit 212 of the power company server 200 checks the disposition location information of the smart meter 300 against the information of the consuming location identified based on the user confirmation request, and in the case where both are identical (s600: OK), the service data transmitting unit 212 extracts the decrypting data of the encrypted data from the service database 227 and transmits the data via the smart meter network (or via the internet) to the authenticating apparatus 400 (s601).

Alternatively, in the case where both are not identical in the check at step s600 (s600: NG), the service data transmitting unit 212 sends a notification of failure of the user confirmation through the smart meter 300 to the authenticating apparatus 400 to terminate the process.

On the other hand, the data decrypting unit 413 of the authenticating apparatus 400 receives the decrypting data via the smart meter network (or the smart meter coupled thereto) (or via the internet) from the power company server 200 (s602). The data decrypting unit 413 decrypts the encrypted data in the storage unit 401 with the decrypting data, generates, for example, the scrambled "gourmet program A" and outputs the generated data to the output unit 406 or the utilizing apparatus such as the digital television coupled thereto (s603).

Seventh Process Procedure Example

Figure 13:
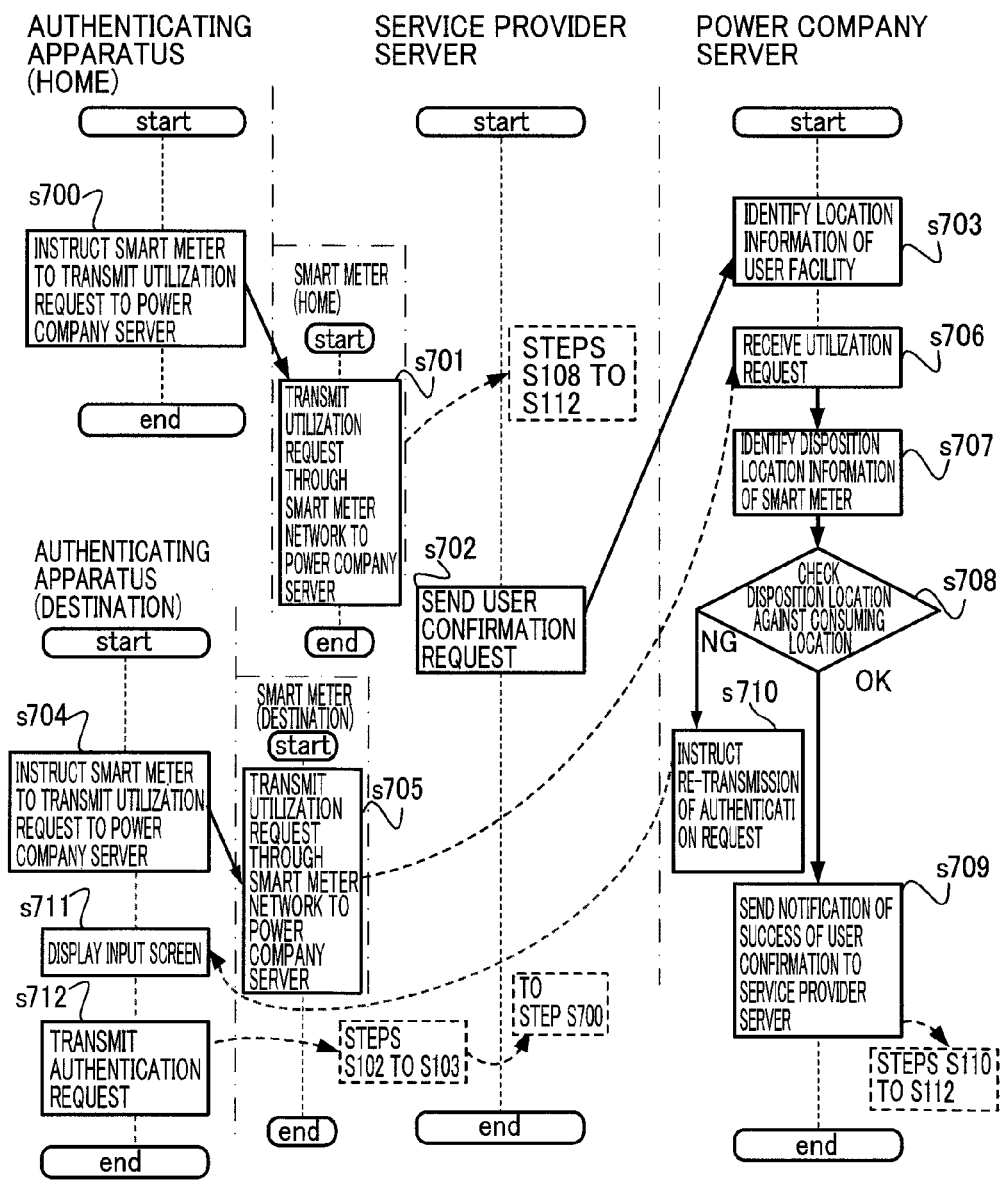
FIG. 13 is a diagram of a seventh process flow example of the information processing method of the embodiment.

FIG. 13 depicts a seventh process flow example of the information processing method of the embodiment. A process will then be described for the case that the location of a user accessing the power company server 200 shifts initially from the home to a location other than the home. For example, this may be assumed as a situation when a user logging into the service provider server 100 from the authenticating apparatus 400 of the home goes out and tries to continuously utilize the electronic contents, etc., utilized earlier in the home at the destination facility (which is naturally another electric power consumer's facility equipped with the authenticating apparatus 400 and the smart meter 300 as in the user's home).

In this case, as already described in the first processing procedure, it is assumed that the user authentication has already been performed once by the confirmation requesting unit 110 of the service provider server 100 checking the user ID and password, i.e., the authentication information against the user information database 126 (step s103) and the user authentication has been successful.

In this case, the transmission instructing unit 411 of the authenticating apparatus 400 instructs the smart meter 300 fixedly disposed on the user's home through the communicating unit 407 to transmit a utilization request for a commercial product or service including the meter ID, i.e., the identification information of the smart meter 300 (also including, e.g., the utilization service ID accepted by the input screen at step s101) to the power company server 200 (s700).

On the other hand, the communication intermediation processing unit 310 of the smart meter 300 receives the instruction and transmits the utilization request (for the first time) to the power company server 200 via the smart meter network 20 (s701). Steps s108 to s112 including the user confirmation process, etc., of the first processing procedure are correspondingly executed, and the authenticating apparatus 400 of the user's home acquires and outputs the data such as electronic contents to the output unit 406 or the utilizing apparatus such as a digital television coupled thereto. The user may view the electronic contents, etc., on the utilizing apparatus such as a digital television.

It is assumed that the user subsequently goes out of the home and arrives at a destination within a predetermined time (e.g., within an automatic logoff time). It is also assumed that the user activates the authentication apparatus 400 in the destination facility and succeeds in a process of performing the login again or overlapped login, for example. The confirmation requesting unit 110 of the service provider server 100 sends to the power company server 200 a user confirmation request including an electric power consumer ID (acquired by using the user ID as a key to search the service user information database 126) as the identification information of the user (s702). The user confirmation request includes the utilization service ID included in the authentication request.

The user facility identifying unit 210 of the power company server 200 then receives the user confirmation request from the service provider server 100 and checks the electric power consumer ID of the user included in the user confirmation request against the electric power consumer database 225 and identifies the data of "consuming location" as the location information of the user facility of the user (s703). For example, if the electric power consumer ID of the user is "J-001", "Kanagawa-Ken xxxxx" may be identified as the data of the consuming location.

On the other hand, in response to the success of the login process, the transmission instructing unit 411 of the authenticating apparatus 400 in the destination facility instructs the smart meter 300 fixedly disposed on the destination facility through the communicating unit 407 to transmit a utilization request for a commercial product or service including the meter ID, i.e., the identification information of the smart meter 300 (also including the utilization service ID specified by the user at the time of the re-login) to the power company server 200 (s704).

On the other hand, the communication intermediation processing unit 310 of the smart meter 300 in the destination facility receives the instruction and transmits the utilization request (for the second time) to the power company server 200 via the smart meter network 20 (s705).

The re-authentication instructing unit 213 of the power company server 200 receives with the communicating unit 207 the utilization request transmitted (for the second time) from the smart meter 300 of the destination facility via the smart meter network 20 (s706). The re-authentication instructing unit 213 checks the meter ID of the smart meter 300 of the destination facility included in the utilization request against the meter information database 226 and identifies the disposition location information of the smart meter 300 (=location of the destination facility) (s707). In the case where the meter ID of the smart meter 300 disposed in the destination facility is "M-002", "Tokyo-To xxxxx" may be identified as the meter disposition location information.

The re-authentication instructing unit 213 checks the identified disposition location information "Tokyo-To xxxxx" of the smart meter 300 against the location information of the user facility=consuming location "Kanagawa-Ken xxxxx" identified based on the user confirmation request at step s705 (s708). In the case where both are identical in this check (s708: OK), the re-authentication instructing unit 213 sends a notification of success of the user confirmation including the electric power consumer ID, i.e., the identification information of the user to the service provider server 100 (s709) and the same process as steps s110 to s112 of the first process procedure example are executed.

Alternatively, in the case where both are not identical in the check at step s708 (s708: NG), the re-authentication instructing unit 213 sends an instruction for retransmission of the authentication request to the authenticating apparatus 400 in the user existing facility=destination facility by determining that the user has moved from the home (s710).

On the other hand, the authentication requesting unit 410 of the authenticating apparatus 400 receives the instruction for retransmission of the authentication request from the power company server 200 and calls and displays the input screen data of the authentication information of the user (such as ID and password) from the storage unit 401 onto the output unit 406 (s711). The user in the destination facility views this input screen and enters a set of the user ID and password=authentication information with the input unit 405.

The authentication requesting unit 410 of the authenticating apparatus 400 accepts the authentication information of the user with the input unit 405 through the input screen, and transmits an authentication request including the authentication information through the communicating unit 407 to the service provider server 100 via the Internet, for example (s712). Steps s102 to s103 in the first process procedure example are subsequently executed and the process is returned to step s700.

Eighth Process Procedure Example

Figure 14:
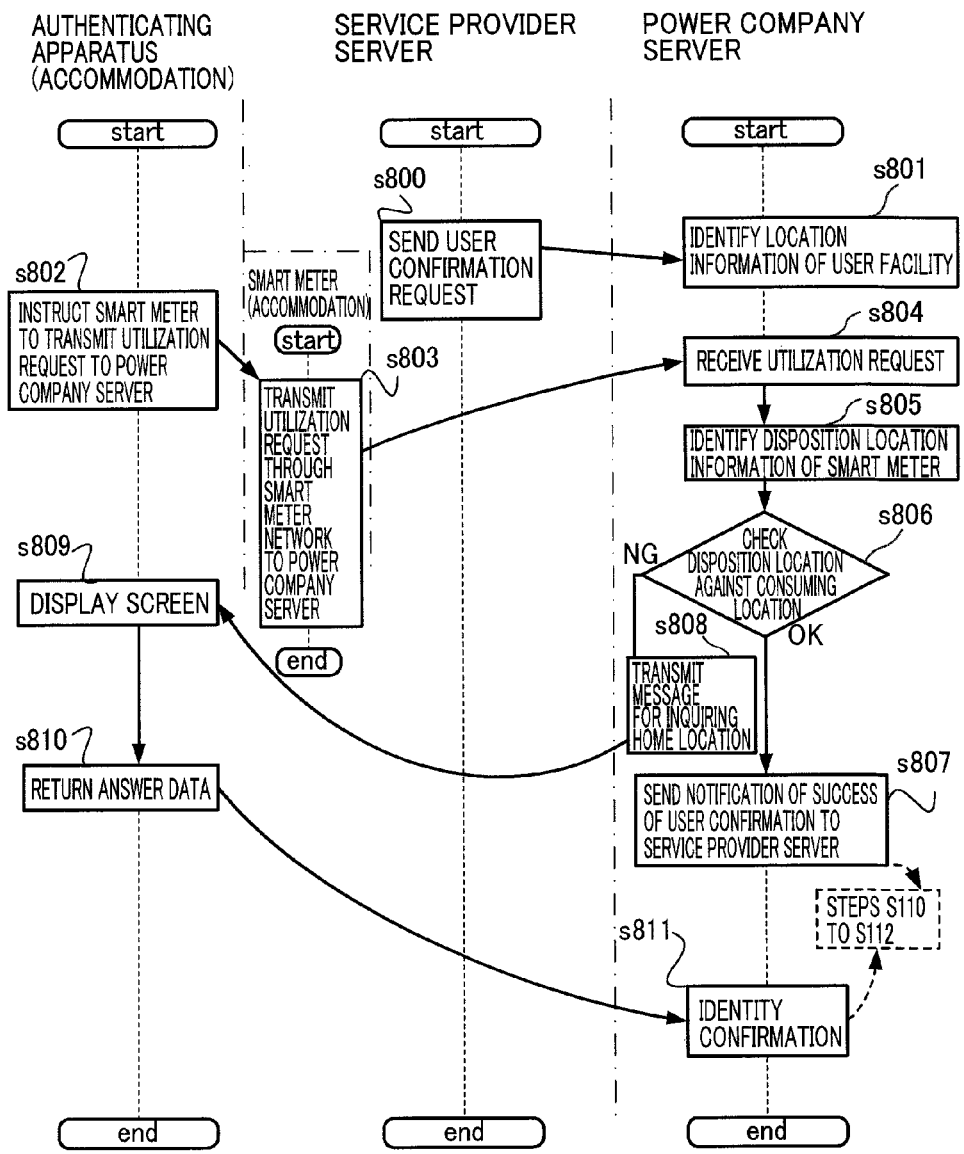
FIG. 14 is a diagram of an eighth process flow example of the information processing method of the embodiment.

FIG. 14 depicts an eighth process flow example of the information processing method of the embodiment. A process will then be described for the case that the location of a user accessing the power company server 200 is other than the home, etc., registered in the power company server 200 in advance. For example, this may be assumed as a situation when a user is staying in an accommodation facility other than the home (which is naturally another electric power consumer's facility equipped with the authenticating apparatus 400 and the smart meter 300 as in the user's home) because of a business trip, etc., and tries to utilize electronic contents, etc., with the utilizing apparatus such as a digital television.

In this case, as already described in the first processing procedure, it is assumed that the user authentication has already been performed by the confirmation requesting unit 110 of the service provider server 100 checking the user ID and password, i.e., the authentication information against the user information database 126 (step s103), and the user authentication has been successful.

The confirmation requesting unit 110 of the service provider server 100 sends to the power company server 200 a user confirmation request including an electric power consumer ID (acquired by using the user ID as a key to search the service user information database 126) as the identification information of the user (s800). The user confirmation request includes the utilization service ID included in the authentication request.

The user facility identifying unit 210 of the power company server 200 receives the user confirmation request from the service provider server 100, checks the electric power consumer ID of the user included in the user confirmation request against the electric power consumer database 225 and identifies the data of "consuming location" as the location information of the user facility of the user (s801). For example, if the electric power consumer ID of the user is "J-001", "Kanagawa-Ken xxxxx" may be identified as the data of the consuming location.

On the other hand, in response to the success of the login process, the transmission instructing unit 411 of the authenticating apparatus 400 in the accommodation facility instructs the smart meter 300 fixedly disposed on the destination facility through the communicating unit 407 to transmit a utilization request for a commercial product or service including the meter ID, i.e., the identification information of the smart meter 300 (also including the utilization service ID specified by the user at the time of the login) to the power company server 200 (s802).

On the other hand, the communication intermediation processing unit 310 of the smart meter 300 in the accommodation facility receives the instruction and transmits the utilization request to the power company server 200 via the smart meter network 20 (s803).

The location confirmation processing unit 214 of the power company server 200 receives with the communicating unit 207 a utilization request transmitted from the smart meter 300 of the accommodation facility via the smart meter network 20 (s804). The location confirmation processing unit 214 checks the meter ID of the smart meter 300 of the accommodation facility included in the utilization request against the meter information database 226 and identifies the disposition location information (=location of the accommodation facility) of the smart meter 300 (s805). For example, if the meter ID of the smart meter 300 disposed in the accommodation facility is "M-003", "Osaka-Fu xxxxx" may be identified as the meter disposition location information from the meter information database 226.

The location confirmation processing unit 214 checks the identified disposition location information "Osaka-Fu xxxxx" of the smart meter 300 against the location information of the user facility=consuming location "Kanagawa-Ken xxxxx" identified based on the user confirmation request at step s801 (s806). In the case where both are identical in this check (s806: OK), the location confirmation processing unit 214 sends a notification of success of the user confirmation including the electric power consumer ID, i.e., the identification information of the user to the service provider server 100 (s807) and the same process as steps s110 to s112 of the first process procedure example are executed.

Alternatively, in the case where both are not identical in the check at step s806 (s806: NG), the location confirmation processing unit 214 determines that the user is accessing from other than the user facility, and transmits a message for inquiring the location of the user's home or the disposition address of the smart meter 300 fixedly disposed in the home to the authenticating apparatus 400 in the user existing facility =the accommodation facility (s808). The message is formed as data of address options by the location confirmation processing unit 214 reading the information of "correct answer" for the user's home address or smart meter disposition address from the electric power consumer database 225 or the meter information database 226, and mixing this "correct answer" with a plurality of "wrong answers", for example. When generating the "wrong answers", the location confirmation processing unit 214 may be assumed to generate the wrong answers by using the addresses same as the address of the correct answer up to prefecture, city, or town name, for example. For the portions of the wrong answers other than those same as the correct answer, it can be assumed that city names and town names are set as those randomly extracted from the electric power consumer database 225 or the meter information database 226 and that block numbers and house numbers are set as random number values.

On the other hand, the answer returning unit 412 of the authenticating apparatus 400 receives the message from the power company server 200 and reads and displays the screen data for inputting an answer to the message from the storage unit 401 onto the output unit 406 (s809). The answer returning unit 412 accepts an answer input from the user through the screen displayed at step s809 and returns the accepted answer data, i.e., any one piece of address information among the address options to the power company server 200 (s810).

The location confirmation processing unit 214 of the power company server 200 checks the answer returned from the authenticating apparatus 400 of the accommodation facility against data about the user in the electric power consumer database 225, or checks the answer against data about the user in the meter information database 226 and performs the identity confirmation of the user (s811). The identity confirmation is performed on the basis that the authentic user should be able to correctly answer for the user's home or the disposition address of the smart meter 300 while unauthorized users are unable to answer correctly.

In the case where this identity confirmation is successful, the location confirmation processing unit 214 executes the process same as the case that the disposition location information of the smart meter 300 is identical to the location information of the user facility identified based on the user confirmation request (the process by the confirmation result notifying unit 211 or the service data transmitting unit 212: steps s110 to s112).

Other Examples

For example, the data acquire by the power company server 200 in accordance with the execution of above steps (e.g., a meter ID and a meter disposition location ID among the data items of the service utilization history database 127) is transmitted to the power company server 200, and the power company server 200 is assumed to store the data acquired in accordance with the execution of above steps (e.g., a utilization date, a utilization ID, a utilization service ID, a utilization start time, and a utilization end time among the data items of the service utilization history database 127) and the data acquired from the power company server 200 into the service utilization history database 127. For each of the data of the utilization date, the utilization start time, and the utilization end time, the date and time of the reception of the notification of success of the user confirmation may be acquired from a clock function naturally provided in the power company server 200 as a computer.

For example, when the input unit 105 receives an instruction from a supervisor or at certain intervals, the service provider server 100 extracts data of user ID, utilization date, utilization start time, and utilization end time from a record of the service utilization history database 127. In this case, it is assumed that the service provider server 100 is communicably coupled to an entrance/exit managing apparatus through a network. The entrance/exit managing apparatus is an apparatus that manages the entrance and exit of a person in the user facility and may be assumed as an apparatus that performs identity authentication to open/close a gate based on an IC card (storing a user ID) presented by a user or biological information. This apparatus retains the user ID, etc., of entered/exited persons identified in association with the identity authentication process in a storage device along with the data of the entrance/exit date and time.

The service provider server 100 transmits to the entrance/exit managing apparatus a search request using the data of the user ID, the utilization date, the utilization start time, and the utilization end time extracted from the service utilization history database 127 as keys, and acquires the entrance/exit data on the utilization date for the user ID. If the corresponding data is unable to be acquired, it is determined that the corresponding user does not actually exist in the facility and an alert message is displayed on the output unit 106, for example. Alternatively, the alert message is transmitted to a supervisor's terminal, etc., linked through a network. On the other hand, in the case where the data has been acquired, the service provider server 100 determines whether a period from the utilization start time to the utilization end time is included within a period between the entry date and time and the exit date and time at the facility and, in the case where it is not included, an alert message is displayed on the output unit 106. Alternatively, the alert message is transmitted to a supervisor's terminal, etc., linked through a network. If such a process is executed in cooperation with the entrance/exit managing apparatus, it is verifiable whether a user who utilized a commercial product/service was really staying in the relevant facility=whether the user is authentic.

Although both the power company server 200 and the service provider server 100 exist in the examples described in the embodiment, in the case where the power company and the service provider are integrated, either the power company server 200 or the service provider server 100 may have all the functions of the power company server 200 and the service provider server 100.

The information processing method of the embodiment may have the following configuration. Namely, the first server may store as predetermined data for utilizing a predetermined commercial product or service in the storage unit divided data A and divided data B having a data size equal to or smaller than the divided data A, which are acquired by dividing the data making up the predetermined commercial product or the data for providing the predetermined service, and in the case where a notification of success of the user confirmation is received from the second server in response to the user confirmation request, the first server may execute a process of transmitting the divided data A via a public line to a predetermined apparatus in the user existing facility and transmitting the divided data B via a dedicated line to the predetermined apparatus in the user existing facility.

In this case, preferably, the predetermined apparatus in the user existing facility executes a process of receiving the divided data A via the public line from the first server, receiving the divided data B via the dedicated line from the first server, combining the divided data A and the divided data B and generating the data making up the predetermined commercial product or the data for providing the predetermined service, and outputting the generated data to the output unit.

This enables the divided data A having a larger size to be transmitted via the Internet and the divided data B having a data size equal to or smaller than the divided data A to be transmitted via the smart meter network to the predetermined apparatus in consideration of differences in the bandwidths and the communication characteristics between the dedicated line such as the smart meter network and the public line such as the internet (generally, the Internet allows for a larger amount of data communication than the smart meter network) to achieve the efficient communications in accordance with the line characteristics. Moreover, since the divided data are sent via physically separated lines, security strength can be ensured because even if data leakage, etc., occurs in one line, the commercial product/service, etc., are unable to be utilized only with the leakage data.

In the information processing method of the embodiment, the first server may store as the predetermined data for utilizing the predetermined commercial product or service in the storage unit as encrypted data of the data making up the predetermined commercial product or encrypted data of the data for providing the predetermined service, and may execute a process of transmitting the encrypted data in advance via the public line to the predetermined apparatus in the user existing facility and a process of transmitting decrypting data of the encrypted data via the dedicated line or via the public line to the predetermined apparatus in the user existing facility, in the case where a notification of success of the user confirmation is received from the second server in response to the user confirmation request.

In this case, preferably, the predetermined apparatus in the user existing facility executes the process of receiving and storing the encrypted data via the public line from the first server into the storage unit in advance, receiving the decrypting data via the dedicated line or via the public line from the first server, decrypting the encrypted data in the storage unit with the decrypting data and generating the data making up the predetermined commercial product or the data for providing the predetermined service, and outputting the generated data to the output unit.

This enables the encrypted data having a larger size to be transmitted via the internet and the decrypting data to be transmitted via the smart meter network to the predetermined apparatus to achieve the efficient communications in accordance with the line characteristics. This also enables the support of such a formation that, for example, the scrambled data (=encrypted data) of contents such as television programs and movies is continuously delivered to (the predetermined apparatus on) the user side and the decrypting data (e.g., decryption key) descrambling the contents is transmitted to the user side only if the user authentication/confirmation is successful, and since the encrypted data and the decrypting data are sent via physically separated lines, security strength can be ensured because even if data leakage, etc., occur in one line, the commercial product/service, etc., are unable to be utilized only with the leakage data.

In the information processing method of the embodiment, the second server may store as predetermined data for utilizing a predetermined commercial product or service in the storage unit the divided data A and the divided data B having a data size equal to or smaller than the divided data A, which are acquired by dividing the data making up the predetermined commercial product or the data for providing the predetermined service, and in the case where the disposition location information of the measuring apparatus is checked against the location information of the user facility identified based on the user confirmation request and both are identical, the second server may execute a process of transmitting the divided data A via a public line to a predetermined apparatus in the user existing facility and transmitting the divided data B via a dedicated line to the predetermined apparatus in the user existing facility.

In this case, preferably, the predetermined apparatus in the user existing facility executes the process of receiving the divided data A via the public line from the second server, receiving the divided data B via the dedicated line from the second server, combining the divided data A and the divided data B and generating the data making up the predetermined commercial product or the data for providing the predetermined service, and outputting the generated data to the output unit.

This enables the second server to transmit the divided data A and B directly to the predetermined apparatus.

In the information processing method of the embodiment, the first server may store as the predetermined data for utilizing the predetermined commercial product or service in the storage unit the encrypted data of the data making up the predetermined commercial product or the encrypted data of the data for providing the predetermined service and may execute the process of transmitting the encrypted data via a public line in advance to the predetermined apparatus in the user existing facility.

In this case, preferably, in the case where the disposition location information of the measuring apparatus is checked against the location information of the user facility identified based on the user confirmation request and both are identical, the second server executes a process of transmitting the decrypting data of the encrypted data via the dedicated line or via the public line to the predetermined apparatus in the user existing facility.

In this case, preferably the predetermined apparatus in the user existing facility executes the process of receiving and storing the encrypted data via the public line from the first server into the storage unit in advance, receiving the decrypting data via the dedicated line or via the public line from the second server, decrypting the encrypted data in the storage unit with the decrypting data and generating the data making up the predetermined commercial product or the data for providing the predetermined service, and outputting the generated data to the output unit.

This enables the support of such a formation that a descrambling process is performed for the scrambled content data=encrypted data transmitted in advance from the first server to the predetermined apparatus with the descrambling data=decrypting data transmitted from the second server to the predetermined apparatus.

In the information processing method of the embodiment, the second server may receive with the communicating unit a utilization request for a commercial product or service including the identification information of the measuring apparatus transmitted for a plurality of times from the measuring apparatus linked through the dedicated line, may check the identification information of the measuring apparatus included in the utilization request received at a certain time point against the meter information database and identify the disposition location information of the measuring apparatus, may check the identification information of the measuring apparatus included in the utilization request received at the next time against the meter information database, after the identified disposition location information of the measuring apparatus is checked against the user facility location information identified based on the user confirmation request and both are identical, and identifies the disposition location information of the measuring apparatus, and may send an instruction for retransmission of the authentication request to the predetermined apparatus in the user existing facility by determining that the user has moved from the user facility, in the case where the identified disposition location information of the measuring apparatus is checked against the user facility location information identified based on the user confirmation request and both are not identical.

In the case where (location of) the user existing facility is different from (location of) the user facility such as the home preliminarily registered for the user, this enables the process to be continued by determining that the authorized user has moved to another location rather than simply not transmitting the data for utilizing the commercial product/service, etc., (=the divided data A and B, the encrypted data, the decrypting data and the like).

In the information processing method of the embodiment, the second server may receive with the communicating unit a utilization request for a commercial product or service including the identification information of the measuring apparatus transmitted from the measuring apparatus linked through the dedicated line, may check the identification information of the measuring apparatus included in the received utilization request against the meter information database and identify the disposition location information of the measuring apparatus, may transmit a message for inquiring the location of the user facility or the disposition location of the measuring apparatus to the predetermined apparatus in the user existing facility by determining that the user is accessing from other than the user facility, in the case where the identified disposition location information of the measuring apparatus is checked against the user facility location information identified based on the user confirmation request and both are not identical, may check an answer about the location of the user facility returned from the predetermined apparatus against data about the user in the electric power consumer database or check an answer about the disposition location of the measuring apparatus against data about the user in the meter information database and perform the identity confirmation of the user, and may execute the process same as the case that the disposition location information of the measuring apparatus is identical to the location information of the user facility identified based on the user confirmation request in the case where the identity confirmation is successful.

This enables a process that supports a situation that a user utilizes the commercial product/service, etc., from a facility other than the home (=facility other than the facility having the measuring apparatus such as a smart meter disposed in correlation with the user, e.g., an accommodation facility, an office, and a customer's facility) to allow the utilization of the commercial product/service, etc., after confirming the home, etc., of the user. Rather than fixing the utilization location of the commercial product/service, etc., to only the user facility in advance, the destination of the user may be defined as the utilization location of the commercial product/service, etc., while ensuring the security strength.

<Second Embodiment>

The first embodiment has been described as the case that electronic contents to be delivered to a utilizing apparatus in an electric power consumer's home are stored in the service provider server in advance. A second embodiment will be described in terms of an example that the service provider server collects information of the utilizing apparatus in the electric power consumer's home to create electronic contents. In the second embodiment, the utilizing apparatus is not limited to an apparatus having a content displaying function such as a digital television and a personal computer and is assumed to be a sensor (for temperature, humidity, human detection, fire, crime prevention, electric power, etc.), an electric lock, a meter (such as a gas meter or a water meter), an energy device (such as a solar power generation device, a fuel cell, an accumulator battery, or a power conditioner), a home electric appliance (such as an air conditioner or a refrigerator), or a household equipment (such as an illumination lamp, an electric blind, an electric roof light window, a ventilation fan, or a crime prevention light). According to this embodiment, information about privacy of an electric power consumer may securely be managed. The portions same as the first embodiment will be described in a simplified manner.

An exemplary configuration of this embodiment will be described with reference to FIG. 1. In this embodiment, a router 600 is disposed between the internet 15 and an in-home network 17. The authenticating apparatus and the smart meter are communicable with each other through the in-home network 17 and the router 600 (another network 18 may be used between the smart meter and the authenticating apparatus). These apparatuses are communicable with the service provider server 100 and the power company server 200 through the internet 15. The smart meter couples a power lead-in wire 90 from the outside and an in-home power line 91 and is able to measure the electric power flowing therebetween. The authenticating apparatus 400 is coupled to a utilizing apparatus 700 through another network 16. A serial communication line such as RS232C and RS485, PLC (power line communication), radio transmission, etc., may be used for the networks 16 and 17.

The service provider server of this embodiment has a data storage processing unit 112 and an in-home data storage DB (database) 128 added to FIG. 1. The data storage processing unit 112 is a program for performing a storage process of the data transmitted from the utilizing apparatus 700 and the authenticating apparatus 400 into the in-home data storage DB 128.

FIG. 15 depicts an exemplary data configuration of the in-home data storage DB. This DB is made up of data ID, in-home data, and time. The data ID is ID for uniquely identifying data transmitted from the utilizing apparatus. For example, the data ID may be, for example, a hardware ID uniquely identifying the utilizing apparatus or data acquired by combining an IPv6 address with a serial number added for each data transmission. The in-home data is data transmitted from a user interface equipment. The time may be a time of data transmission from the user interface equipment or a time when the data is stored in the in-home data storage database. The data storage processing unit 112 manages the in-home data storage database 128, and stores and deletes data in the database.

The authenticating apparatus of this embodiment will be described next. To the exemplary configuration depicted in FIG. 1, an authentication ID saving unit 408 is added for storing the authentication information for the smart meter (such as smart meter ID, password, and authenticating apparatus ID). It is desirable to use a nonvolatile memory that encrypts user ID or that has the tamper-resistant characteristics as the authentication ID saving unit 408. When instructing the smart meter 300 to transmit a utilization request to the power company server, the authentication requesting unit 410 reads the authentication information for the smart meter from the authentication ID saving unit 408, and executes the authentication process with the smart meter 300. This authentication information may be written by a user or an apparatus disposition agent using a tool or may remotely be written by the power company server. The communicating unit 407 of FIG. 1 may separately be provided for the utilizing apparatus and the in-home network.

An exemplary configuration of the smart meter of the embodiment will be described next. To the exemplary configuration depicted in FIG. 1, an authentication ID saving unit 308 is newly added for storing the authentication information for the authenticating apparatus (made up of smart meter ID, password, authenticating apparatus ID, etc.) and an authenticating unit 311 is added as a program that executes the authentication process for the authenticating apparatus. It is desirable to use a nonvolatile memory that encrypts user ID or that has the tamper-resistant characteristics as the authentication ID saving unit 308. The authenticating unit 311 checks the authentication information sent from the authenticating apparatus 400 at the time of the instruction for transmitting the utilization request to the power company server with the authentication information preliminarily saved in the authentication ID saving unit 308 to execute the authentication process. The authenticating information may be written by a user or an apparatus disposition agent using a tool or may remotely be written by the power company server, and although various methods are conceivable, these methods are outside of the scope of the present invention and will not be described. The communicating unit 307 of FIG. 1 may separately be provided for the smart meter network and the in-home network. Instead of using a physical dedicated line as the smart meter network 20, a virtual dedicated line may be established by using the VPN (virtual private network) technology, etc., for the power company server 200 through the router 600 and the internet 15.

Figure 16:
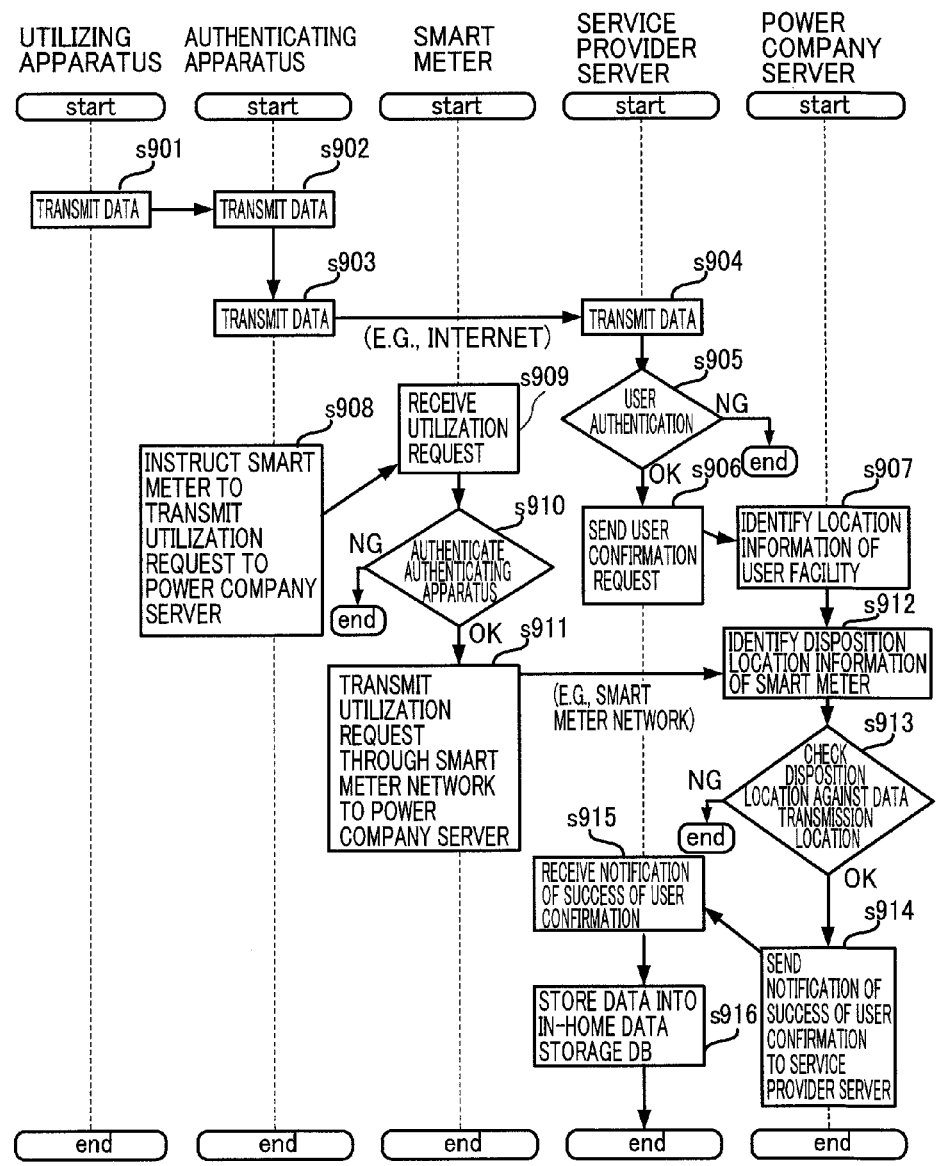
FIG. 16 is a diagram of a process flow example of the information processing method of a second embodiment.

FIG. 16 depicts a process flow example when the information of the utilizing apparatus is registered in the service provider server. It is assumed that the utilizing apparatus and the authenticating apparatus exist in the home (user's facility), which is the consuming location registered at the time of contract with the electric power supplier.

When the utilizing apparatus transmits data (s901), the authenticating apparatus 400 receives the data (s902) and the authentication requesting unit 410 of the authenticating apparatus 400 reads the authenticating information of the user preliminarily stored in the authentication ID saving unit 408 and transmits the authentication request including the authentication information and the utilizing apparatus data (data ID, in-home data, and time) to the service provider server 100 (s903). The transmitted authentication request is received with the communicating unit 107 of the service provider server 100 (s904). The user ID and password, i.e., the authentication information included in the authentication request are checked against the user ID and password stored in the user information database 126 and the user authentication is performed (s905). In the case where the user authentication is successful (s905: OK), the confirmation requesting unit 110 sends a user confirmation request including an electric power consumer ID (retrieved from the user information database 126 by using the user ID as a key) as the identification information of the user to the power company server 200 (s906). The user confirmation request may include the utilization service ID included in the authentication request. On the other hand, in the case where the user authentication fails (s905: NG), the process is terminated after executing a process such as returning a notification of failure of the authentication to the authenticating apparatus 400.

The user facility identifying unit 210 of the power company server 200 receives the user confirmation request from the service provider server 100 and checks the electric power consumer ID included in the user confirmation request against the electric power consumer database 225 and identifies data of "consuming location" as the location information of the user facility of the user (s907).

On the other hand, the transmission instructing unit 411 of the authenticating apparatus 400 instructs the smart meter 300 to transmit a utilization request for a service including the meter ID of the smart meter 300 to the power company server 200 (s908). The transmission instructing unit 411 may instruct the smart meter 300 to transmit the utilization request to the power company server 200 at regular intervals, for example.

The communication intermediation processing unit 310 of the smart meter 300 receiving the instruction receives the utilization request (s909), executes the authentication process for the authenticating apparatus (s910), and transmits the utilization request to the power company server 200 in the case where the authenticating apparatus is authenticated (s911). The transmitted utilization request (including the meter ID) is received by the communicating unit 207 of the power company server and the power company server checks the meter ID of the smart meter 300 included in the utilization request against the meter information database 226 and identifies the disposition location information of the smart meter 300 (s912). The utilization request may include the utilization service ID.

The confirmation result notifying unit 211 checks the identified disposition location information of the smart meter 300, for example, "Kanagawa-Ken xxxxx" against the location information=consuming location "Kanagawa-Ken xxxxx" of the user facility identified based on the user confirmation request at step s907 (s913). In the case where both are identical in this check (s913: OK), a notification of success of the user confirmation including the electric power consumer ID of the user is sent to the service provider server 100 (s914). The notification of success may include the utilization service ID. Alternatively, in the case where both are not identical in the check at step s913 (s913: NG), a notification of failure is sent to the service provider server 100 to terminate the process.

On the other hand, in the case where the notification of success of the user confirmation is received from the power company server 200 (s915), the data storage processing unit 112 of the service provider server 100 stores the data into the in-home data storage DB 128 (s916). Electronic contents are created based on the information of the utilizing apparatus.

As described above, according to this embodiment, if authentication information of a user is stolen and misused for user authentication by a malicious third party penetrating the public line (or dedicated line), the unauthorized user is not allowed to utilize the commercial product/service, etc., and to register the data unless the user succeeds in the check of information, etc., of the measuring device (e.g., smart meter) that should be acquired via the dedicated line such as the smart meter network (or the public line), and therefore, the impersonation may effectively be eliminated. The dedicated line such as the smart meter network is, for example, a dedicated line linking a power, gas, or water usage meter (smart meter) disposed on a power, gas, or water consumer's home=user facility with a server of a power company, a gas company, or a water company, and cannot easily be penetrated by others to steal communication data. Since the information derived from the measuring device=smart meter fixed to the user facility is utilized, the location (e.g., home or destination) of the user wishing to utilize the commercial product/service, etc., or to register the data may be identified in association with the user authentication, and the accuracy of personal identification is improved. In other words, the impersonation becomes more difficult.

Therefore, high security may be ensured for the data communication through a network to prevent the impersonation.

Although the embodiments of the present invention have specifically been described based on the embodiments, this is not a limitation and the present invention may be variously modified within a range not departing from the spirit thereof.

What is claimed is:

1. An information processing method using a first server including
    a first storage unit having stored thereon a user information database that stores identification information and authentication information of a user, and
    a communicating unit that communicates with another apparatus, and a second server including
        a second storage unit having stored thereon an electric power consumer database that stores and correlates identification information of a user, location information of a user facility, and identification information of a measuring apparatus fixed to the user facility to measure an amount of a commercial product or service provided to the user and a meter information database that correlates the identification information of the measuring apparatus with disposition location information thereof and
        a communicating unit that communicates with another apparatus, the information processing method comprising:
    receiving by the first server an authentication request including authentication information of a user with the communicating unit from a predetermined apparatus of a user existing facility coupled through a public line to the first server, checking by the first server the authentication information included in the authentication request against the authentication information in the user information database and performing user authentication, and sending by the first server a user confirmation request including the identification information of the user to the second server in a case where the user authentication is successful, and
    transmitting by the first server predetermined data for utilizing a predetermined commercial product or service to the predetermined apparatus in the user existing facility in a case where a notification of success of user confirmation is received from the second server in response to the user confirmation request;
    receiving by the second server the user confirmation request from the first server, checking by the second server identification information of the user included in the user confirmation request against the electric power consumer database, and identifying by the second server location information of the user facility of the user, and
    receiving with the communicating unit of the second server a utilization request for a commercial product or service including the identification information of the measuring apparatus from the measuring apparatus disposed in the user existing facility linked through a dedicated line with the second server, checking the identification information of the measuring apparatus included in the utilization request against the meter information database and identifying by the second server disposition location information of the measuring apparatus, and sending a notification of success of user confirmation including the identification information of the user to the first server in a case where the identified disposition location information of the measuring apparatus is checked against the user facility location information identified based on the user confirmation request and both are identical, wherein the first server stores predetermined data for utilizing either one of a predetermined commercial product and service in the first storage unit where the predetermined data is divided as divided data A, which is an internet key, and divided data B, which is a smart meter network key, having a data size equal to or smaller than the divided data A, which are acquired by dividing data making up the predetermined commercial product or data for providing the predetermined service, and in the case where a notification of success of the user confirmation is received from the second server in response to the user confirmation request, the first server executes a process of transmitting the divided data A via a public line to the predetermined apparatus in the user existing facility and transmitting the divided data B via a dedicated line to the predetermined apparatus in the user existing facility, wherein the predetermined apparatus in the user existing facility executes a process of receiving the divided data A via the public line from the first server, receiving the divided data B via the dedicated line from the first server, combining the divided data A and the divided data B and generating the data making up the predetermined commercial product or the data for providing the predetermined service, and outputting the generated data to an output unit.

2. The information processing method of claim 1, wherein the first server stores as predetermined data for utilizing either one of a predetermined commercial product and service in the first storage unit either one of encrypted data of data making up the predetermined commercial product and encrypted data of data for providing the predetermined service, and the first server executes a process of transmitting the encrypted data in advance via a public line to the predetermined apparatus in the user existing facility and a process of transmitting decrypting data of the encrypted data via the dedicated line or via the public line to the predetermined apparatus in the user existing facility in a case where a notification of success of the user confirmation is received from the second server in response to the user confirmation request, wherein the predetermined apparatus in the user existing facility has a third storage unit and executes a process of receiving and storing the encrypted data via the public line from the first server into the third storage unit in advance, receiving the decrypting data via either one of the dedicated line and the public line from the first server, decrypting the encrypted data in the third storage unit with the decrypting data to generate the data making up the predetermined commercial product or the data for providing the predetermined service, and outputting the generated data to an output unit.

3. The information processing method of claim 1, wherein the second server receives with the communicating unit a utilization request for either one of a commercial product and service including identification information of the measuring apparatus transmitted for a plurality of times from the measuring apparatus linked through the dedicated line, checks the identification information of the measuring apparatus included in the utilization request received at a certain time point against the meter information database and identifies disposition location information of the measuring apparatus, checks the identification information of the measuring apparatus included in the utilization request received at a later time against the meter information database, after the identified disposition location information of the measuring apparatus is checked against the user facility location information identified based on the user confirmation request and both are identical, and identifies the disposition location information of the measuring apparatus, and sends an instruction for retransmission of the authentication request to the predetermined apparatus in the user existing facility by determining that the user has moved from the user facility in a case where the identified disposition location information of the measuring apparatus is checked against the user facility location information identified based on the user confirmation request and both are not identical.

4. The information processing method of claim 1, wherein the second server receives with the communicating unit a utilization request for either one of a commercial product and service including identification information of the measuring apparatus transmitted from the measuring apparatus linked through the dedicated line, checks the identification information of the measuring apparatus included in the received utilization request against the meter information database and identifies disposition location information of the measuring apparatus, transmits a message for inquiring location of either one of the user facility and disposition location of the measuring apparatus to the predetermined apparatus in the user existing facility by determining that the user is accessing from other than the user facility in a case where the identified disposition location information of the measuring apparatus is checked against the user facility location information identified based on the user confirmation request and both are not identical, checks an answer about the location of the user facility returned from the predetermined apparatus against data about the user in the electric power consumer database or checks an answer about the disposition location of the measuring apparatus against data about the user in the meter information database and performs identity confirmation of the user, and executes the process same as the case that the disposition location information of the measuring apparatus is identical to the location information of the user facility identified based on the user confirmation request in a case where the identity confirmation is successful.

5. The information processing method of claim 1, wherein the measuring apparatus is coupled to an authenticating apparatus in a wired or wireless manner, and wherein the predetermined data is created from information of a utilizing apparatus coupled to the authenticating apparatus.

6. The information processing method of claim 5, wherein the utilizing apparatus is any one of a sensor device, a solar power generation device, a fuel cell, an accumulator battery, a power conditioner, a home electric appliance, and a household equipment, and wherein the predetermined data is created from utilization information of the utilizing apparatus.

7. An information processing method using a first server including
a first storage unit having stored thereon a user information database that stores identification information and authentication information of a user and
a communicating unit that communicates with another apparatus, and a second server including
a second storage unit having stored thereon an electric power consumer database that stores and correlates identification information of a user, location information of a user facility, and identification information of a measuring apparatus fixed to the user facility to measure an amount of a commercial product or service provided to the user and a meter information database that correlates the identification information of the measuring apparatus with disposition location information thereof and
a communicating unit that communicates with another apparatus, the second server, the information processing method comprising:
receiving by the first server an authentication request including authentication information of a user with the communicating unit from a predetermined apparatus of a user existing facility coupled through a public line to the first server, checking by the first server the authentication information included in the authentication request against the authentication information in the user information database and performing by the first server user authentication, and sending by the first server a user confirmation request including the identification information of the user to the second server in a case where the user authentication is successful;
receiving by the second server the user confirmation request from the first server, checking by the second server identification information of the user included in the user confirmation request against the electric power consumer database and identifying location information of the user facility of the user;, and
receiving with the communicating unit of the second server a utilization request for either one of a commercial product and service including the identification information of the measuring apparatus from the measuring apparatus disposed in the user existing facility linked through a dedicated line with the second server, checking by the second server the identification information of the measuring apparatus included in the utilization request against the meter information database and identifying by the second server disposition location information of the measuring apparatus, and transmitting by the second server predetermined data for utilizing either one of a predetermined commercial product and service to the predetermined apparatus in the user existing facility in a case where the identified disposition location information of the measuring apparatus is checked against the user facility location information identified based on the user confirmation request and both are identical,
wherein the second server stores predetermined data for utilizing either one of a predetermined commercial product and service in the second storage unit where the predetermined data is divided as divided data A, which is an internet key, and divided data B, which is a smart meter network key, having a data size equal to or smaller than the divided data A, which are acquired by dividing either one of data making up the predetermined commercial product and data for providing the predetermined service, and in the case where the identified disposition location information of the measuring apparatus is checked against the user facility location information identified based on the user confirmation request and both are identical, the second server executes a process of transmitting the divided data A via a public line to the predetermined apparatus in the user existing facility and transmitting the divided data B via a dedicated line to the predetermined apparatus in the user existing facility, wherein the predetermined apparatus in the user existing facility executes a process of receiving the divided data A via the public line from the second server, receiving the divided data B via the dedicated line from the second server, combining the divided data A and the divided data B and generating either one of the data making up the predetermined commercial product and the data for providing the predetermined service, and outputting the generated data to an output unit.

8. The information processing method of claim 7, wherein the first server stores as predetermined data for utilizing either one of a predetermined commercial product and service in the first storage unit either one of encrypted data of data making up the predetermined commercial product and encrypted data of data for providing the predetermined service, and the first server executes a process of transmitting the encrypted data in advance via a public line to the predetermined apparatus in the user existing facility, wherein in the case where the identified disposition location information of the measuring apparatus is checked against the user facility location information identified based on the user confirmation request and both are identical, the second server executes a process of transmitting decrypting data of the encrypted data via either one of the dedicated line and the public line to the predetermined apparatus in the user existing facility, and wherein the predetermined apparatus in the user existing facility has a third storage unit and executes a process of receiving and storing the encrypted data via the public line from the first server into the third storage unit in advance, receiving the decrypting data via either one of the dedicated line and the public line from the second server, decrypting the encrypted data in the third storage unit with the decrypting data and generating either one of the data making up the predetermined commercial product and the data for providing the predetermined service, and outputting the generated data to the output unit.

9. An information processing system comprising:

a first server including
a first storage unit having stored thereon a user information database that stores identification information and authentication information of a user,
a communicating unit that communicates with another apparatus,
a confirmation requesting unit that receives an authentication request including authentication information of a user with the communicating unit from a predetermined apparatus of a user existing facility coupled through a public line, that checks the authentication information included in the authentication request against the authentication information in the user information database and performs user authentication, and that sends a user confirmation request including the identification information of the user to a second server in a case where the user authentication is successful, and
a service data transmitting unit that transmits predetermined data for utilizing either one of a predetermined commercial product and service to the predetermined apparatus in the user existing facility in a case where a notification of success of user confirmation is received from the second server in response to the user confirmation request; and a second server including
a second storage unit having stored thereon an electric power consumer database that stores and correlates identification information of a user, location information of a user facility, and identification information of a measuring apparatus fixed to the user facility to measure an amount of either one of a commercial product and service provided to the user and a meter information database that correlates the identification information of the measuring apparatus with disposition location information thereof,
a communicating unit that communicates with another apparatus,
a user facility identifying unit that receives the user confirmation request from the first server and that checks identification information of the user included in the user confirmation request against the electric power consumer database to identify location information of the user facility of the user, and
a confirmation result notifying unit that receives with the communicating unit a utilization request for either one of a commercial product and service including the identification information of the measuring apparatus from the measuring apparatus disposed in the user existing facility linked through a dedicated line, that checks the identification information of the measuring apparatus included in the utilization request against the meter information database and identifies disposition location information of the measuring apparatus, and that sends a notification of success of user confirmation including the identification information of the user to the first server in a case where the identified disposition location information of the measuring apparatus is checked against the user facility location information identified based on the user confirmation request and both are identical, wherein the first server stores the predetermined data for utilizing either one of a predetermined commercial product and service in the first storage unit where the predetermined data is divided as divided data A, which is an internet key, and divided data B, which is a smart meter network key, having a data size equal to or smaller than the divided data A, which are acquired by dividing data making up the predetermined commercial product or data for providing the predetermined service, and in the case where a notification of success of the user confirmation is received from the second server in response to the user confirmation request, the service data transmitting unit transmits the divided data A via a public line to the predetermined apparatus in the user existing facility and transmits the divided data B via a dedicated line to the predetermined apparatus in the user existing facility, wherein the predetermined apparatus in the user existing facility executes a process of receiving the divided data A via the public line from the first server, receiving the divided data B via the dedicated line from the first server, combining the divided data A and the divided data B and generating the data making up the predetermined commercial product or the data for providing the predetermined service, and outputting the generated data to an output unit.

10. An information processing system comprising:

a first server including
- a first storage unit having stored thereon a user information database that stores identification information and authentication information of a user,
- a communicating unit that communicates with another apparatus,
- a confirmation requesting unit that receives an authentication request including authentication information of a user with the communicating unit from a predetermined apparatus of a user existing facility coupled through a public line, that checks the authentication information included in the authentication request against the authentication information in the user information database and performs user authentication, and that sends a user confirmation request including the identification information of the user to a second server if the user authentication is successful; and the second server including
- a second storage unit having stored thereon an electric power consumer database that stores and correlates identification information of a user, location information of a user facility, and identification information of a measuring apparatus fixed to the user facility to measure an amount of either one of a commercial product and service provided to the user and a meter information database that correlates the identification information of the measuring apparatus with disposition location information thereof,
- a communicating unit that communicates with another apparatus,
- a user facility identifying unit that receives the user confirmation request from the first server and that checks identification information of the user included in the user confirmation request against the electric power consumer database and identifies location information of the user facility of the user, and
- a service data transmitting unit that receives with the communicating unit a utilization request for either one of a commercial product and service including the identification information of the measuring apparatus from the measuring apparatus disposed in the user existing facility linked through a dedicated line, that checks the identification information of the measuring apparatus included in the utilization request against the meter information database and identifies disposition location information of the measuring apparatus, and that transmits predetermined data for utilizing either one of a predetermined commercial product and service to the predetermined apparatus in the user existing facility in a case where the identified disposition location information of the measuring apparatus is checked against the user facility location information identified based on the user confirmation request and both are identical, wherein the second server stores the predetermined data for utilizing either one of a predetermined commercial product and service in the second storage unit where the predetermined data is divided as divided data A, which is an internet key, and divided data B, which is a smart meter network key, having a data size equal to or smaller than the divided data A, which are acquired by dividing either one of data making up the predetermined commercial product and data for providing the predetermined service, and in the case where the identified disposition location information of the measuring apparatus is checked against the user facility location information identified based on the user confirmation request and both are identical, the service data transmitting unit transmits the divided data A via a public line to the predetermined apparatus in the user existing facility and transmits the divided data B via a dedicated line to the predetermined apparatus in the user existing facility, wherein the predetermined apparatus in the user existing facility executes a process of receiving the divided data A via the public line from the second server, receiving the divided data B via the dedicated line from the second server, combining the divided data A and the divided data B and generating either one of the data making up the predetermined commercial product and the data for providing the predetermined service, and outputting the generated data to an output unit.

\* \* \* \* \*